(12) United States Patent
Im et al.

(10) Patent No.: US 9,030,487 B2
(45) Date of Patent: May 12, 2015

(54) ELECTRONIC DEVICE FOR DISPLAYING THREE-DIMENSIONAL IMAGE AND METHOD OF USING THE SAME

(75) Inventors: Soungmin Im, Seoul (KR); Sunjin Yu, Seoul (KR); Sangki Kim, Seoul (KR); Kyungyoung Lim, Seoul (KR); Yongwon Cho, Seoul (KR); Taehyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 13/195,580

(22) Filed: Aug. 1, 2011

(65) Prior Publication Data

US 2013/0033483 A1  Feb. 7, 2013

(51) Int. Cl.
*G06F 3/01* (2006.01)
*G06F 3/0481* (2013.01)
*G06F 3/0482* (2013.01)
*H04N 13/04* (2006.01)

(52) U.S. Cl.
CPC ............ *G06F 3/017* (2013.01); *H04N 13/0497* (2013.01); *G06F 3/04815* (2013.01); *G06F 3/0482* (2013.01)

(58) Field of Classification Search
USPC ................................. 345/619, 156
See application file for complete search history.

(56) References Cited

U.S. PATENT DOCUMENTS

| | | | | |
|---|---|---|---|---|
| 5,528,263 A * | 6/1996 | Platzker et al. | ............... | 345/156 |
| 6,191,773 B1 * | 2/2001 | Maruno et al. | ................ | 345/158 |
| 6,222,465 B1 * | 4/2001 | Kumar et al. | .................. | 341/20 |
| 6,434,255 B1 * | 8/2002 | Harakawa | ..................... | 382/103 |
| 6,577,330 B1 * | 6/2003 | Tsuda et al. | .................... | 715/782 |
| 7,173,605 B2 * | 2/2007 | Fong et al. | ..................... | 345/168 |
| 7,665,041 B2 * | 2/2010 | Wilson et al. | ................. | 715/860 |
| 8,111,239 B2 * | 2/2012 | Pryor et al. | ..................... | 345/156 |
| 8,230,367 B2 * | 7/2012 | Bell et al. | ....................... | 715/863 |
| 8,279,168 B2 * | 10/2012 | Glomski et al. | .............. | 345/156 |
| 8,413,053 B2 * | 4/2013 | Nakanishi | ...................... | 715/716 |
| 8,456,416 B2 * | 6/2013 | Izumi | ............................ | 345/156 |
| 8,457,353 B2 * | 6/2013 | Reville et al. | ................. | 382/103 |
| 8,462,148 B1 * | 6/2013 | Reisman et al. | ............. | 345/419 |
| 8,487,871 B2 * | 7/2013 | Langridge et al. | ............ | 345/157 |
| 8,659,658 B2 * | 2/2014 | Vassigh et al. | ................ | 348/143 |
| 8,872,762 B2 * | 10/2014 | Galor et al. | ................... | 345/156 |

(Continued)

FOREIGN PATENT DOCUMENTS

| | | | |
|---|---|---|---|
| KR | 10-2008-0029730 A | | 4/2008 |
| KR | 10-2011-0055868 A | | 5/2011 |
| WO | WO 2007/097548 A1 | | 8/2007 |

*Primary Examiner* — M Good Johnson
(74) *Attorney, Agent, or Firm* — Birch, Stewart, Kolasch & Birch, LLP

(57) ABSTRACT

An electronic device for displaying a three-dimensional image and a method of using the same, and more particularly, to an electronic device for displaying a three-dimensional image and a method of using the same that can provide a user interface for controlling positions of a three-dimensional icon and a virtual layer including the same according to a user gesture are provided. The electronic device for displaying a three-dimensional image includes a camera for photographing a gesture action in three-dimensional space; a display unit for displaying a virtual layer including at least one object with a first depth at three-dimensional virtual space; and a controller for selectively performing one of a first action of changing a depth in which the virtual layer is displayed to a second depth and a second action of changing a position of the object, according to the gesture action based on a gesture input mode.

18 Claims, 28 Drawing Sheets

(56) References Cited

U.S. PATENT DOCUMENTS

| | | | |
|---|---|---|---|
| 2002/0041327 A1* | 4/2002 | Hildreth et al. | 348/42 |
| 2002/0064382 A1* | 5/2002 | Hildreth et al. | 396/100 |
| 2006/0209021 A1 | 9/2006 | Yoo et al. | |
| 2008/0120577 A1* | 5/2008 | Ma et al. | 715/863 |
| 2009/0027337 A1* | 1/2009 | Hildreth | 345/158 |
| 2009/0303231 A1* | 12/2009 | Robinet et al. | 345/419 |
| 2010/0151946 A1* | 6/2010 | Wilson et al. | 463/36 |
| 2010/0199221 A1* | 8/2010 | Yeung et al. | 715/850 |
| 2011/0141009 A1* | 6/2011 | Izumi | 345/156 |
| 2011/0154201 A1* | 6/2011 | Nakanishi | 715/716 |
| 2011/0197161 A1* | 8/2011 | Mattingly et al. | 715/810 |
| 2011/0267265 A1* | 11/2011 | Stinson | 345/157 |
| 2012/0293513 A1* | 11/2012 | Krishnaswamy | 345/423 |

* cited by examiner

FIG.10
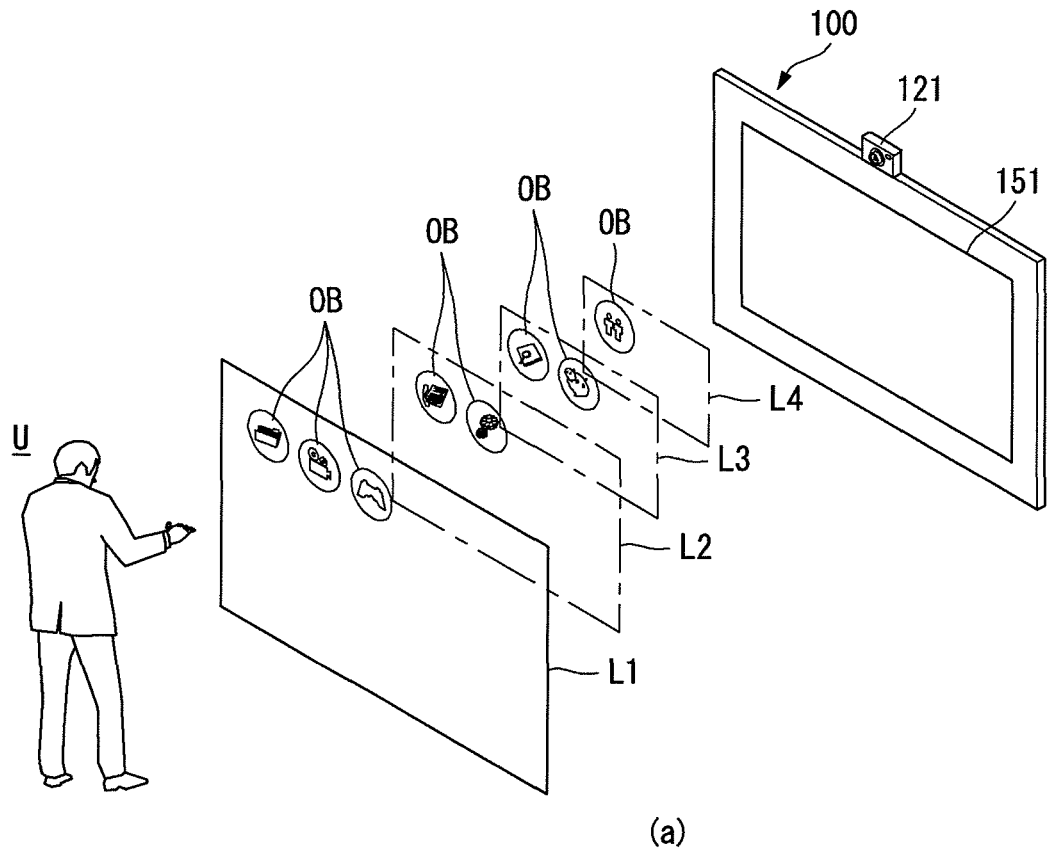
(a)
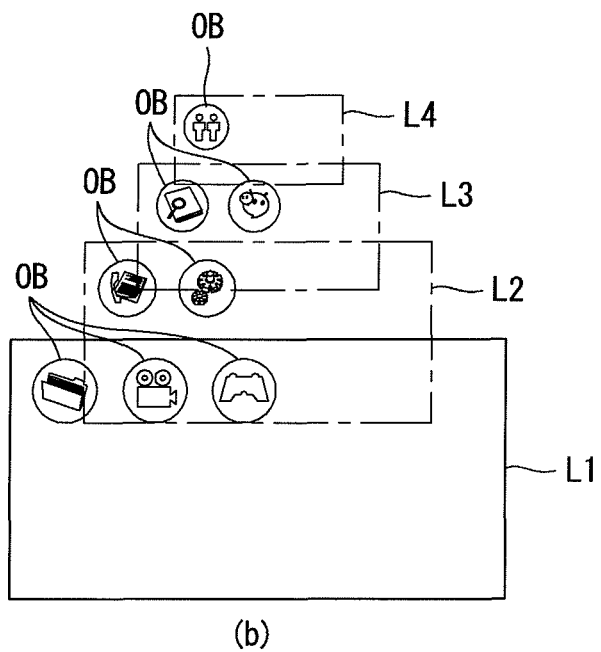
(b)

FIG.11
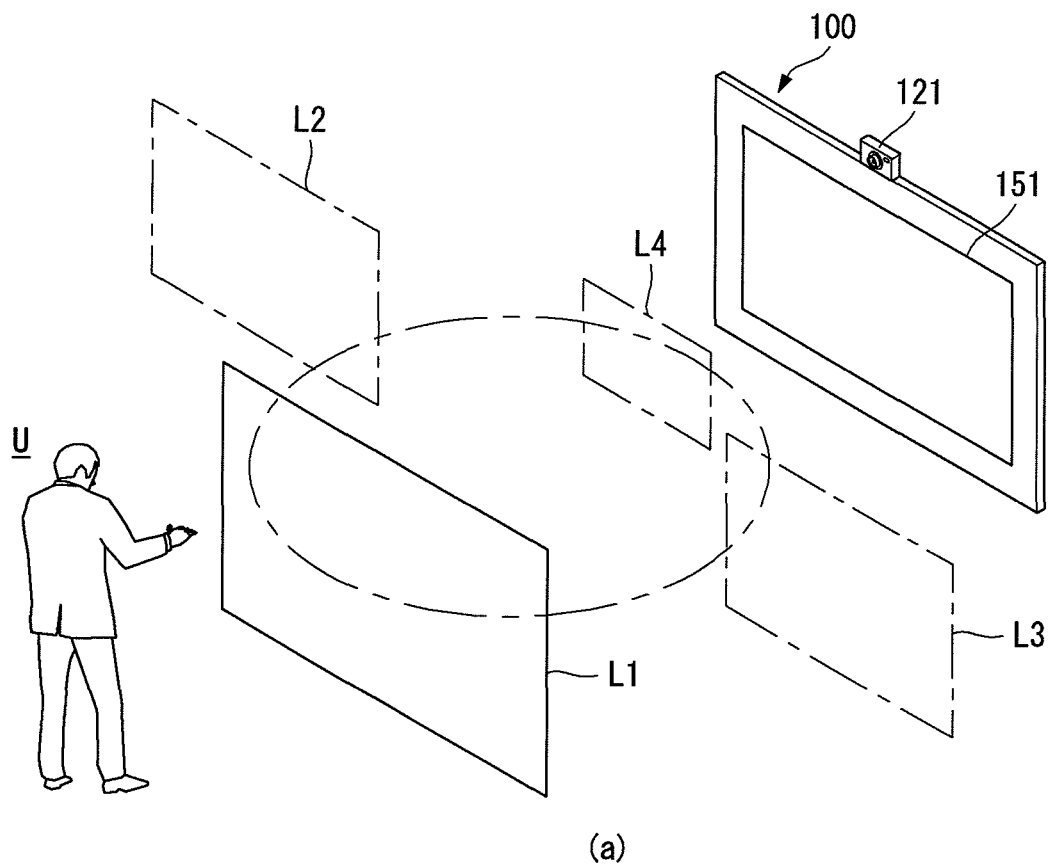
(a)
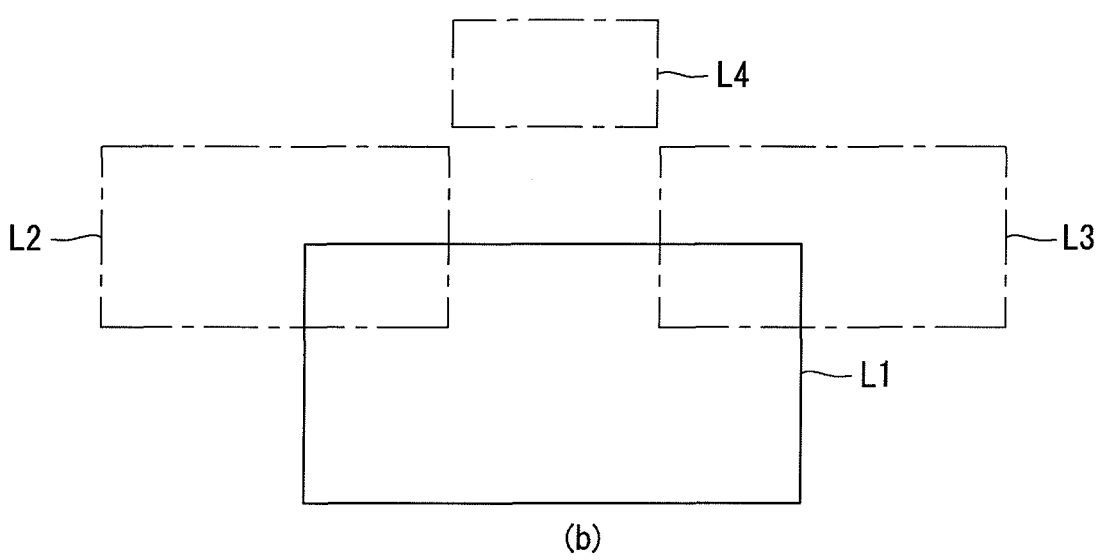
(b)

FIG.14
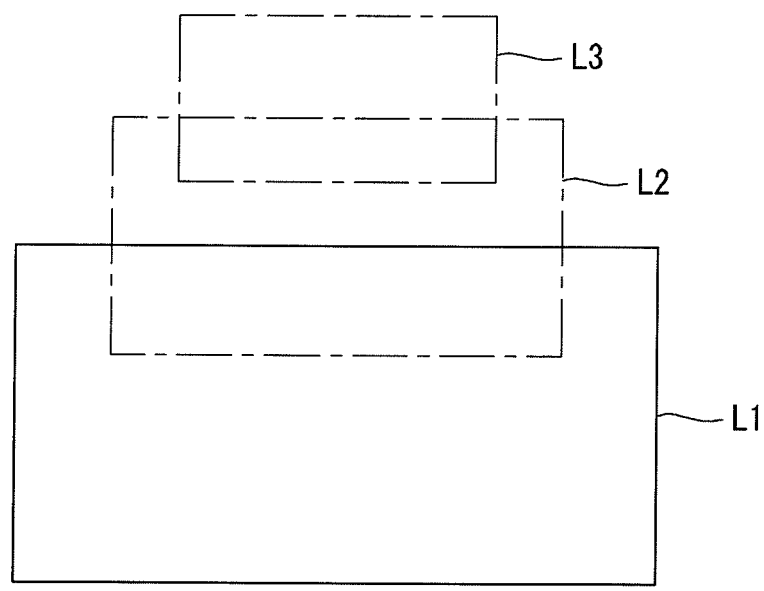
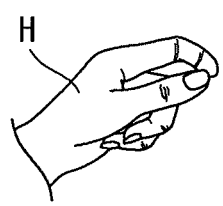

FIG.15
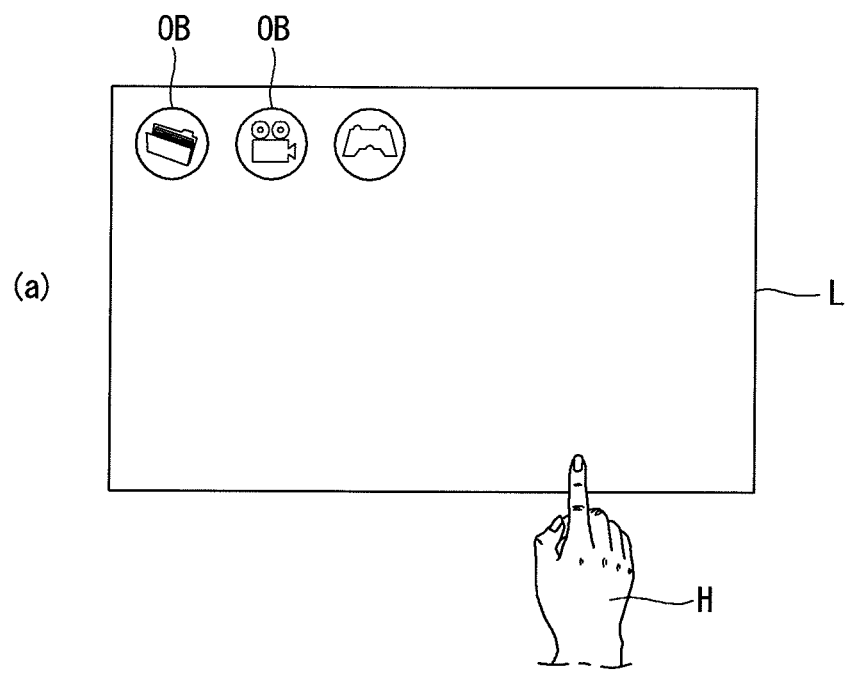
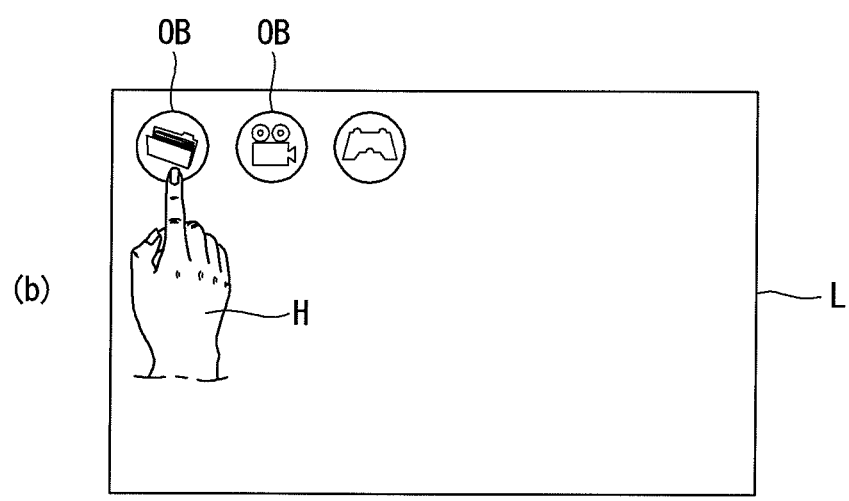

FIG.17
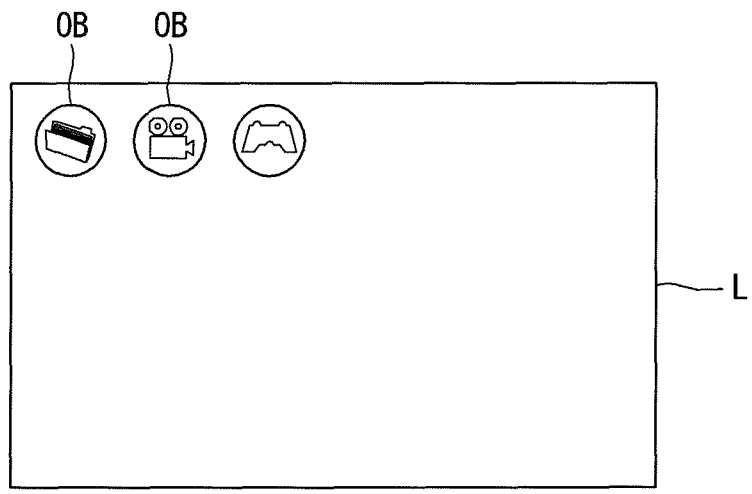
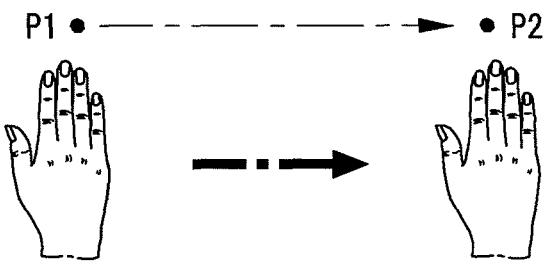
FIG.18
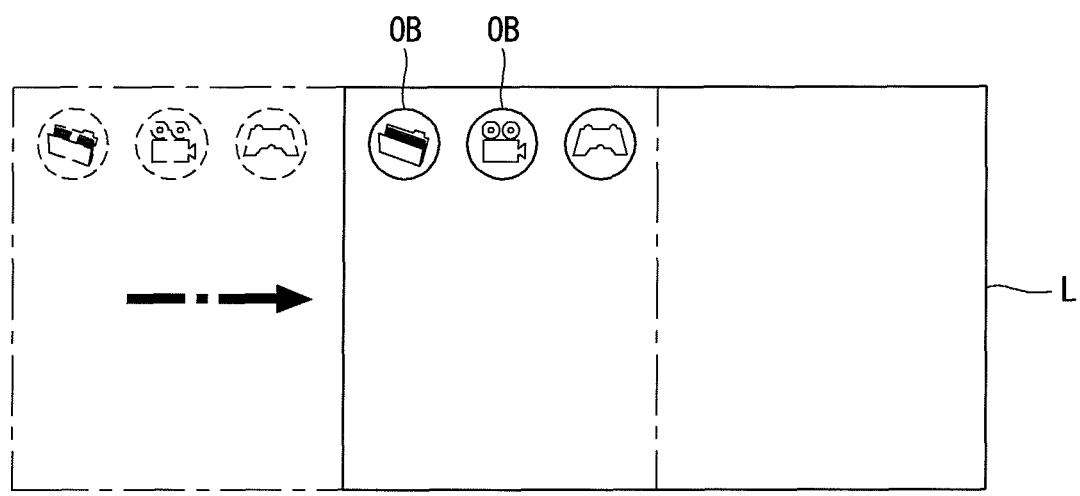

FIG.21
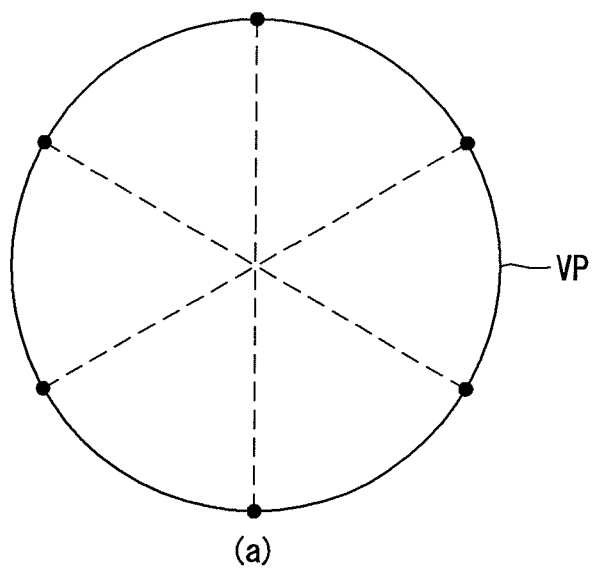
(a)
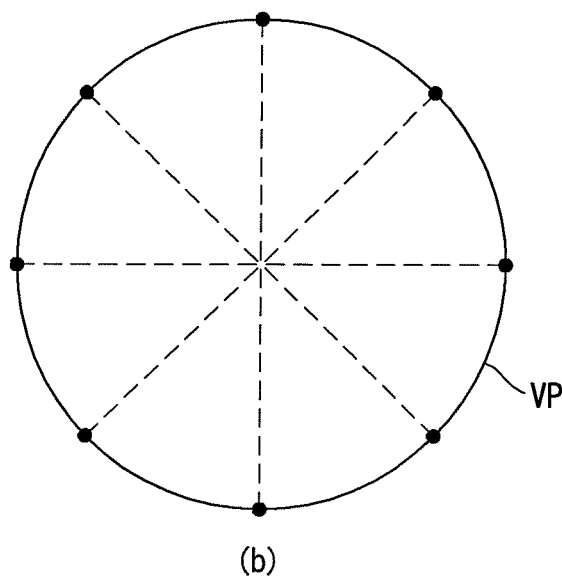
(b)

FIG. 27
(a)
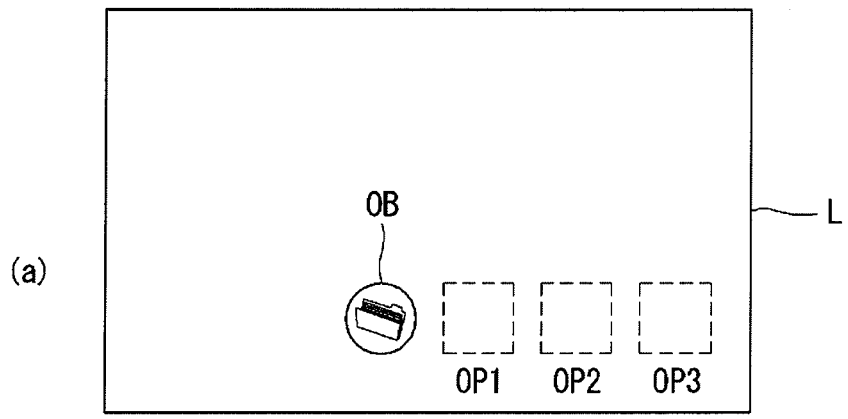
(b)
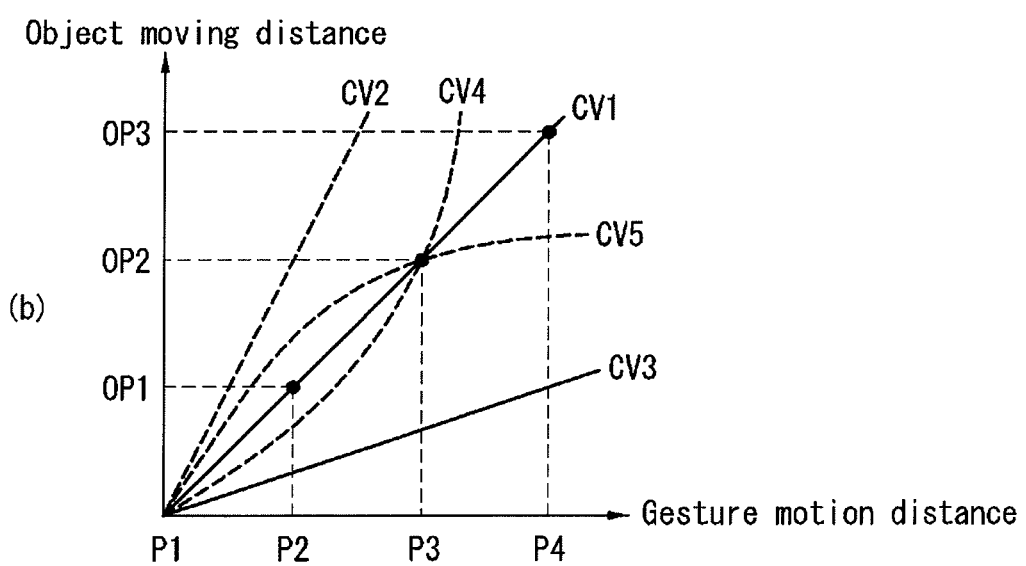

FIG.28
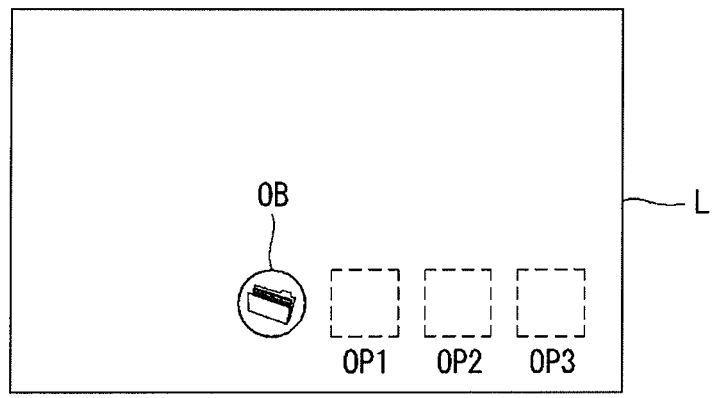
(a)
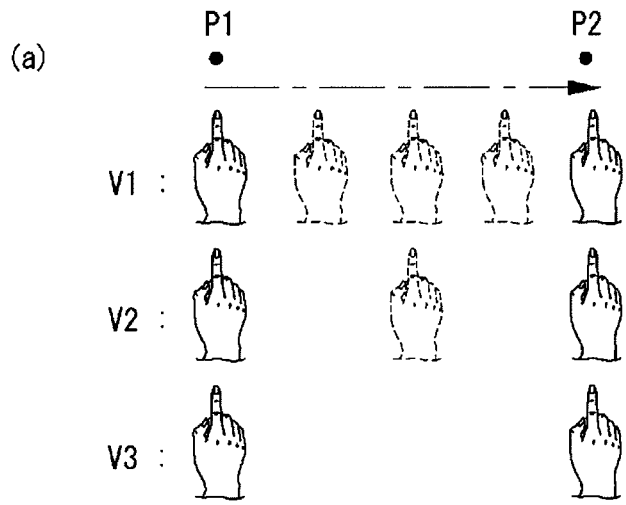
(b)
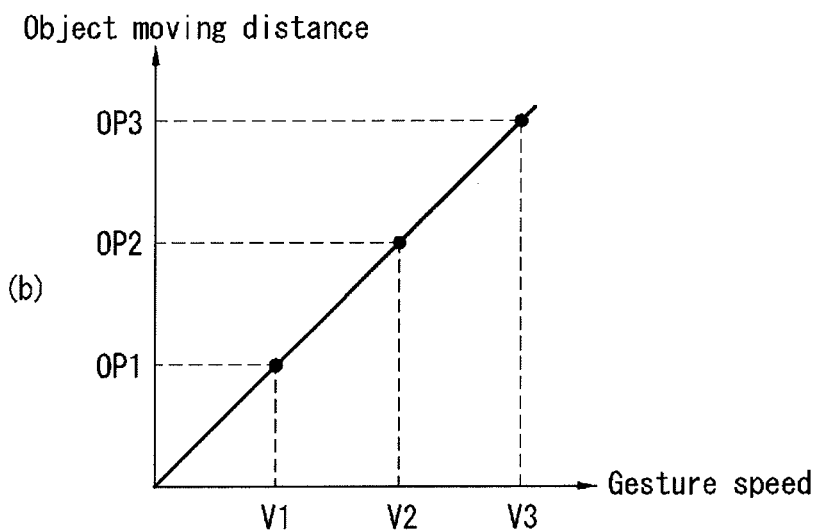

FIG.31
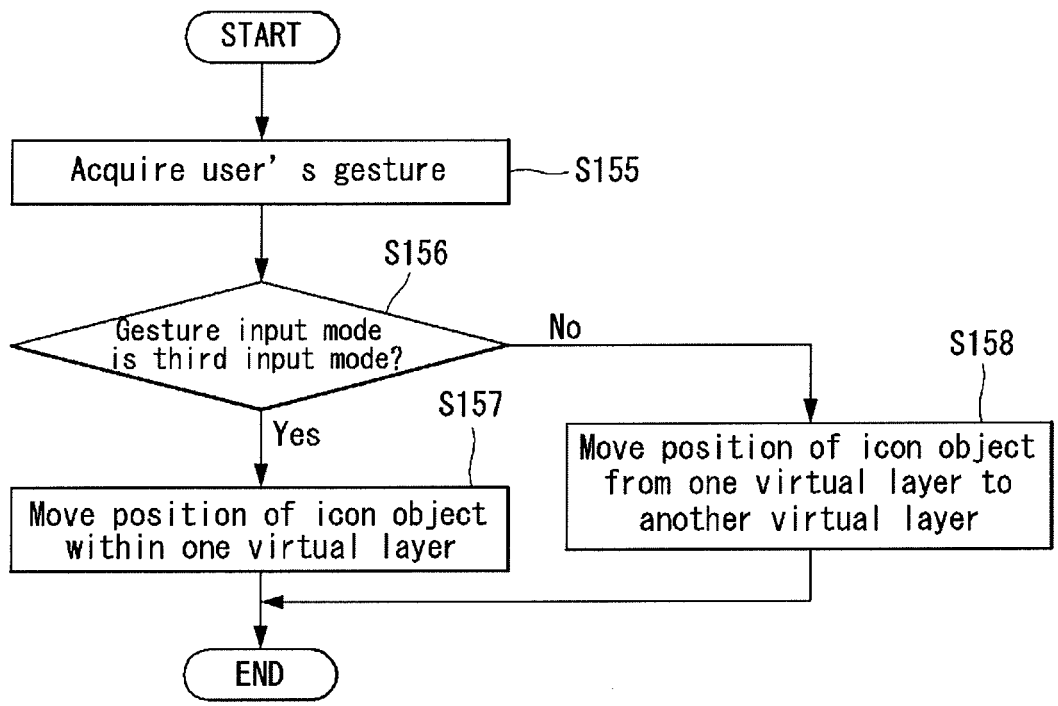
FIG.32
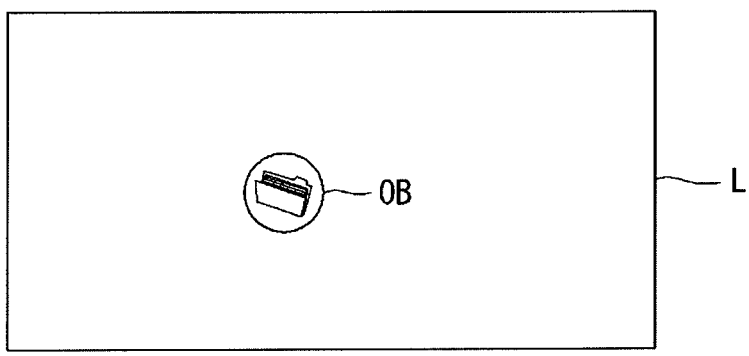
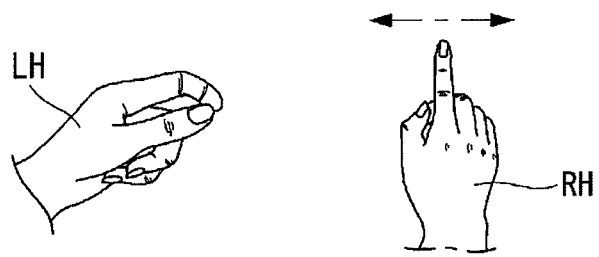

FIG.33
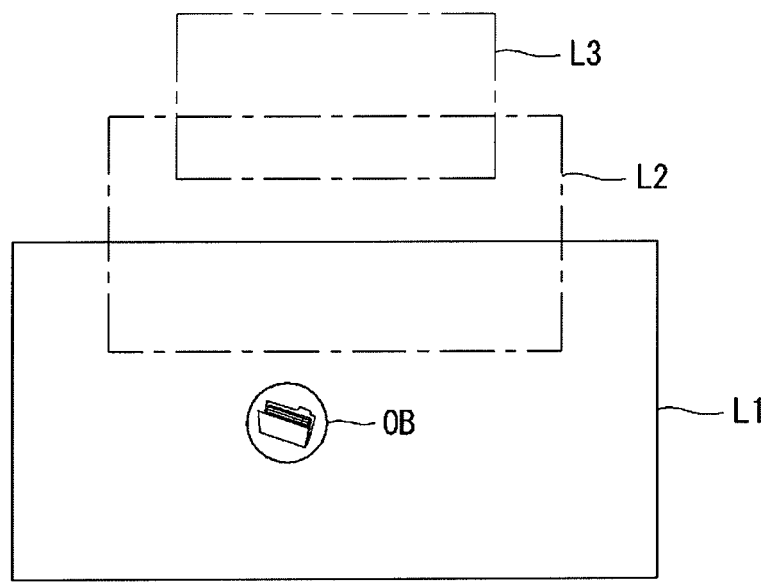
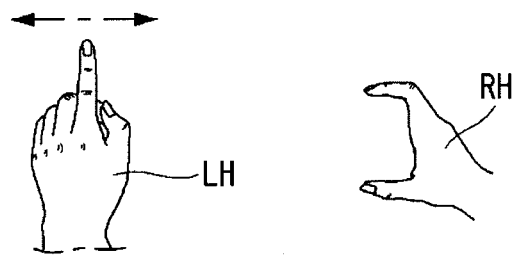
FIG.34
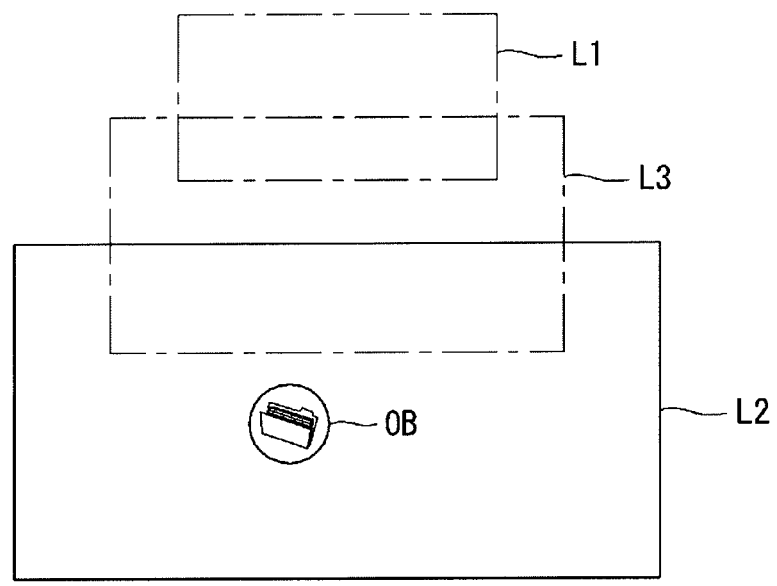

ELECTRONIC DEVICE FOR DISPLAYING THREE-DIMENSIONAL IMAGE AND METHOD OF USING THE SAME

BACKGROUND OF THE INVENTION

1. Field of the Invention

The present invention relates to an electronic device for displaying a three-dimensional image and a method of using the same, and more particularly, to an electronic device for displaying a three-dimensional image and a method of using the same that can provide a user interface for controlling positions of a three-dimensional icon and a virtual layer including the same according to a user gesture.

2. Discussion of the Background Art

As terminals such as a personal computer (PC), a laptop computer, and a mobile phone have various functions, the terminals are embodied as a multimedia player having complex functions, such as photographing of a picture or a moving picture, reproduction of music or a moving picture, game playing, and reception of broadcasting.

The terminal as a multimedia player generally has a function of displaying various image information and thus may be called a display device.

The display device is classified into a portable type and a fixed type according to mobility. The portable display device may include, for example, a laptop computer and a mobile phone, and the fixed display device may include, for example, a television and a monitor for a desktop computer.

SUMMARY OF THE INVENTION

The present invention has been made in view of the above problems, and provides an electronic device for displaying a three-dimensional image and a method of using the same, and more particularly, to an electronic device for displaying a three-dimensional image and a method of using the same that can enables a user to easily approach various icons (or menu icons) provided as a three-dimensional image by providing a user interface that can control positions of a three-dimensional icon and a virtual layer including the same according to a user gesture.

In an embodiment of the present invention, an electronic device for displaying a three-dimensional image is provided.

In an embodiment of the present invention, an electronic device includes: a camera for photographing a gesture action in three-dimensional space; a display unit for displaying a virtual layer including at least one object with a first depth at three-dimensional virtual space; and a controller for selectively performing one of a first action of changing a depth in which the virtual layer is displayed to a second depth and a second action of changing a position of the object, according to the gesture action based on a gesture input mode.

The controller may set the gesture input mode to a mode corresponding to a preset gesture input according to the preset gesture input.

The controller may set the gesture input mode to a mode corresponding to a preset voice command according to the preset voice command.

The first action may further change a vertical position and/or a lateral position of the virtual layer on three-dimensional space.

When a plurality of virtual layers having different depths is displayed through the display unit, the first action may change all depths of the plurality of virtual layers.

When a plurality of virtual layers having different depths is displayed through the display unit, the controller may control the display unit to align and display the plurality of virtual layers on a virtual orbit on three-dimensional space.

In another embodiment of the present invention, an electronic device includes: a camera for photographing a gesture action at three-dimensional space; a three-dimensional display unit for displaying a virtual layer including at least one object with a first depth at three-dimensional virtual space; and a controller for selecting one object of at least one object included in the virtual layer and for determining whether the gesture action is a first type gesture or a second type gesture and for changing a position of the selected object according to the gesture action and for selectively performing one of a first action of changing a position of the selected object within the virtual layer and a second action of changing a position of the selected object from the virtual layer to another virtual layer, according to a determination result.

The controller may determine a type of the gesture action based on a direction of the gesture action.

When the gesture action is performed in a direction substantially parallel to the virtual layer, the controller may determine the gesture action as a first type gesture.

When the gesture action is performed in a direction substantially perpendicular to the virtual layer, the controller may determine the gesture action as a second type gesture.

The controller may determine the another virtual layer at which the selected object is to be positioned from a plurality of virtual layers based on at least one of a moving distance and a speed of the gesture.

The second action may include an action that does not change a depth in which the virtual layer and the another virtual layer are displayed and an action that changes a depth of the object.

The second action may include an action that changes a depth in which the virtual layer and the another virtual layer are displayed and an action that does not change a depth of the object.

In another embodiment of the present invention, an electronic device includes: a camera for photographing a gesture action at three-dimensional space; a display unit for displaying a virtual layer including at least one object with a first depth at three-dimensional virtual space and displaying a virtual layer different from the virtual layer with a second depth at the virtual space; and a controller for determining whether a first input mode or a second input mode and selectively performing one of a first action of changing a position of some of the at least one object within the virtual layer according to the gesture action based on a determination result and a second action of changing a position of some of the at least one object from the virtual layer to another virtual layer according to an input gesture action.

The controller may set the input mode to a mode corresponding to a preset gesture input according to the preset gesture input.

The controller may set the input mode to a mode corresponding to a preset voice command according to the preset voice command.

The controller may determine the another virtual layer at which the selected object is to be positioned from a plurality of virtual layers based on at least one of a moving distance and a speed of the gesture.

The second action may include an action that does not change a depth in which the virtual layer and the another virtual layer are displayed and an action that changes a depth of the object.

The second action may include an action that changes a depth in which the virtual layer and the another virtual layer are displayed and an action that does not change a depth of the object.

In another embodiment of the present invention, a method of displaying a three-dimensional image is provided.

In another embodiment of the present invention, a method of displaying a three-dimensional image, the method includes: photographing a gesture action at three-dimensional space; displaying a virtual layer including at least one object with a first depth at three-dimensional virtual space; and selectively performing one of a first action of changing a depth in which the virtual layer is displayed to a second depth and a second action of changing a position of the object, according to the gesture action based on a gesture input mode.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIGS. 10 and 11 are diagrams illustrating examples of displaying an icon object on three-dimensional space according to an exemplary embodiment of the present invention;

FIG. 14 is a diagram illustrating an example of changing a gesture input mode from a first mode to a second mode by a user's gesture according to an exemplary embodiment of the present invention;

FIGS. 15A-15B are diagrams illustrating an example of pre-selecting the virtual layer and/or the icon object through a gesture according to an exemplary embodiment of the present invention;

FIGS. 17 and 18 are diagrams illustrating a change of a position of a virtual layer with a gesture according to an exemplary embodiment of the present invention;

FIGS. 21A and 21B are diagrams illustrating an example of determining positions of specific points at which a virtual layer is positioned on a virtual orbit according to an exemplary embodiment of the present invention;

FIGS. 25 to 30 are diagrams illustrating a method of changing a position of an icon object with a gesture according to an exemplary embodiment of the present invention;

FIG. 31 is a flowchart illustrating a method of changing a position of an icon object according to an exemplary embodiment of the present invention;

FIG. 32 is a diagram illustrating a method of changing a position of an icon object according to an exemplary embodiment of the present invention; and FIGS. 33 and 34 are diagrams illustrating another method of changing a position of an icon object according to an exemplary embodiment of the present invention.

DETAILED DESCRIPTION

Embodiments of the invention will now be described more fully with reference to the accompanying drawings. Embodiments of the invention may, however, be take many different forms and should not be construed as being limited to the embodiments set forth herein.

Hereinafter, a mobile terminal relating to embodiments of the invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
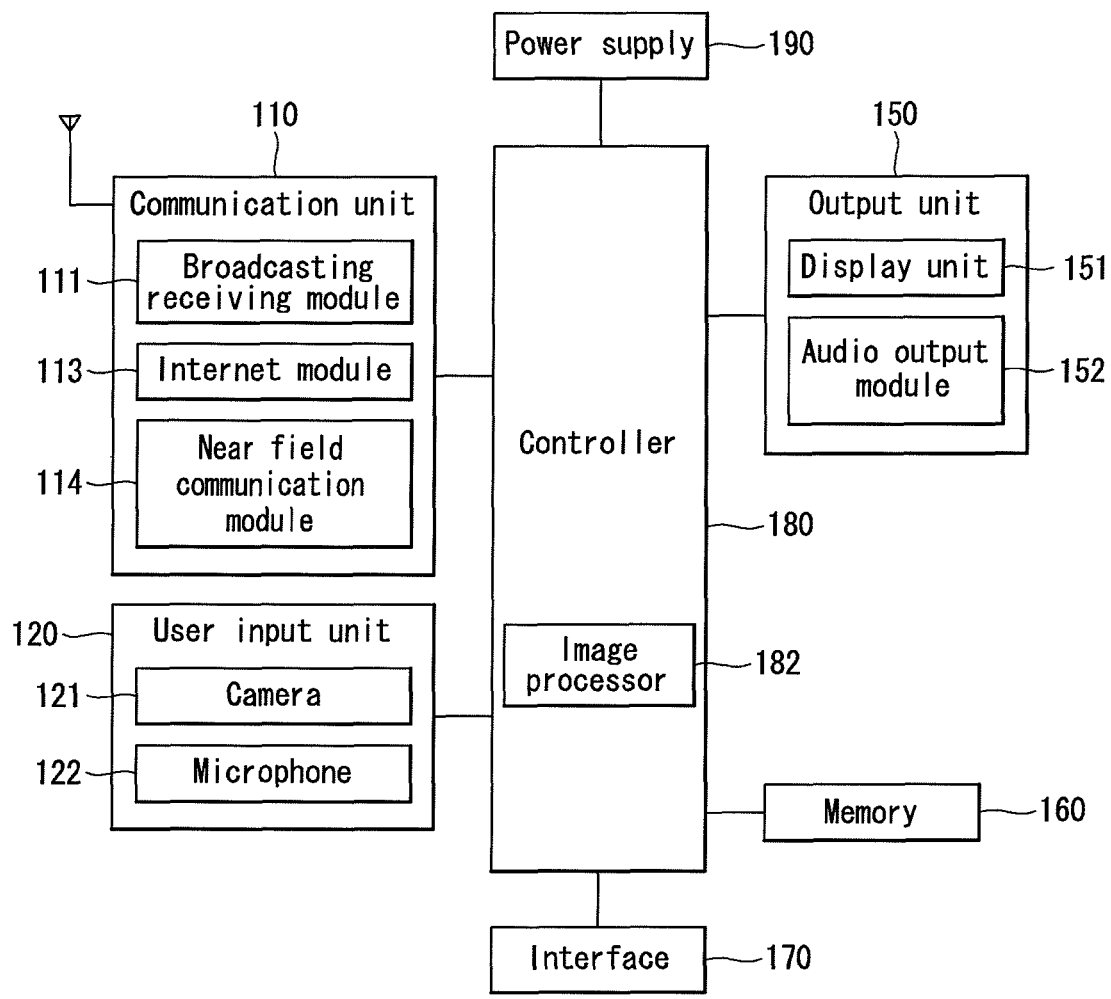
FIG. 1 is a block diagram illustrating a configuration of a display device according to an exemplary embodiment of the present invention.

FIG. 1 is a block diagram of a display device relating to an embodiment of this document.

As shown in FIG. 1, a display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The near field communication module 114 may correspond to a module for near field communication. Further, Bluetooth®, radio frequency identification (RFID), infrared data association (IrDA), ultra wideband (UWB) and/or ZigBee® may be used as a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display unit 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display unit 151 and an audio output module 152.

The display unit 151 may display information processed by the display device 100. The display unit 151 may display a user interface (UI) or a graphic user interface (GUI) relating to the display device 100. In addition, the display unit 151 may include at least one of a liquid crystal display, a thin film transistor liquid crystal display, an organic light-emitting diode display, a flexible display and a three-dimensional display. Some of these displays may be of a transparent type or a light transmissive type. That is, the display unit 151 may include a transparent display. The transparent display may include a transparent liquid crystal display. The rear structure of the display unit 151 may also be of a light transmissive type. Accordingly, a user may see an object located behind the body of terminal through the transparent area of the terminal body, occupied by the display unit 151.

The display device 100 may include at least two display units 151. For example, the display device 100 may include a plurality of display units 151 that are arranged on a single face at a predetermined distance or integrated displays. The plurality of display units 151 may also be arranged on different sides.

Further, when the display unit 151 and a sensor sensing touch (hereafter referred to as a touch sensor) form a layered structure that is referred to as a touch screen, the display unit 151 may be used as an input device in addition to an output device. The touch sensor may be in the form of a touch film, a touch sheet, and a touch pad, for example.

The touch sensor may convert a variation in pressure applied to a specific portion of the display unit 151 or a variation in capacitance generated at a specific portion of the display unit 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display unit 151.

The audio output module 152 may output audio data received from the radio communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the mobile terminal 100. The interface 170 may receive data from the external devices or power and transmit the data or power to internal components of the display device terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the mobile terminal 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in this document can be implemented in software, hardware or a computer readable recording medium. According to hardware implementation, embodiments of this document may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
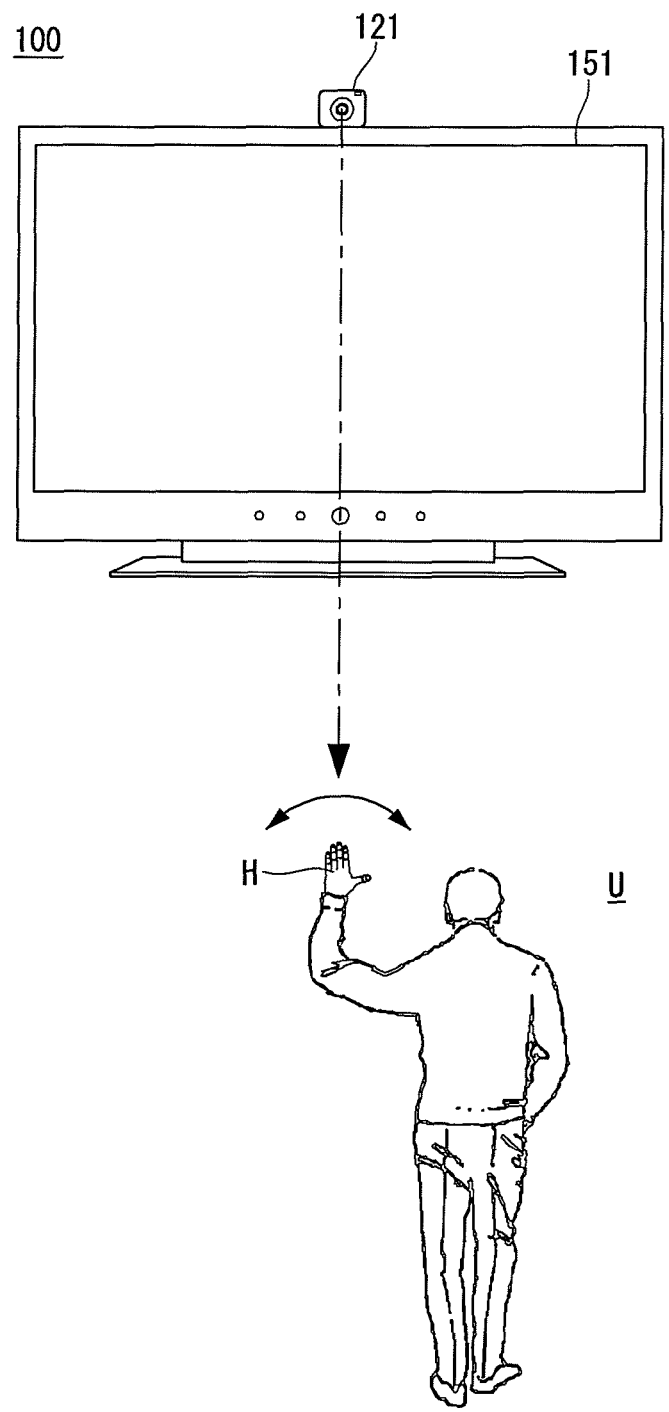
FIG. 2 is a diagram illustrating an example of an input of a user's gesture to the display device of FIG. 1 according to an exemplary embodiment of the present invention.

FIG. 2 is a diagram illustrating an example of an input of a user's gesture to the display device of FIG. 1.

As shown in FIG. 2, the display device 100 according to an exemplary embodiment of the present invention photographs a gesture taken by a user U and executes an appropriate function corresponding thereto.

The display device 100 may be various electronic devices including a display unit 151 for displaying an image. That is, the electronic device may be a fixed type electronic device fixed at a particular position due to a large volume like a television shown in FIG. 2, or a mobile terminal such as a mobile phone. The display device 100 includes the camera 121 for photographing a gesture of the user U.

The camera 121 may be an optical electronic device for photographing from the front side of the display device 100. The camera 121 may be a two-dimensional camera for photographing a two-dimensional image and/or a three-dimensional camera for photographing a three-dimensional image. For convenience of understanding, FIG. 2 illustrates a case where one camera 121 is provided at an upper center of the display device 100, but a kind, a position, and the number of the camera 121 may be varied, as needed.

When the controller 180 finds a user U having a control right, the controller 180 chases the user U having a control right. The control right is provided and chased based on an image photographed through the camera 121 provided in the display device 100. That is, the controller 180 continuously determines whether a particular user U exists by analyzing a photographed image, whether the particular user U performs a gesture action necessary for acquiring a control right, and whether the particular user U moves.

The controller 180 analyzes a gesture of a user having a control right in a photographed image. For example, even if a user U makes a particular gesture, when the user U has no control right, a particular function may not be performed. However, if the user U has a control right, a particular function corresponding to the particular gesture may be executed.

A gesture of the user U may be various actions using a body of the user U. For example, an action in which the user U sits down, gets up, runs, or moves may be a gesture. Further, an action in which the user uses a head, a foot, a hand H may also be a gesture. Hereinafter, in various gestures of the user U, a hand gesture using a hand H of the user U is exemplified. However, such a description is described for convenience of understanding, and the present invention is not limited to the user's hand gesture.

Particularly, when the display unit 151 is a three-dimensional display, the present invention can be applied thereto. Hereinafter, a method of displaying a stereoscopic image through the display unit 151, which is a three-dimensional display, will be described.

Figure 3:
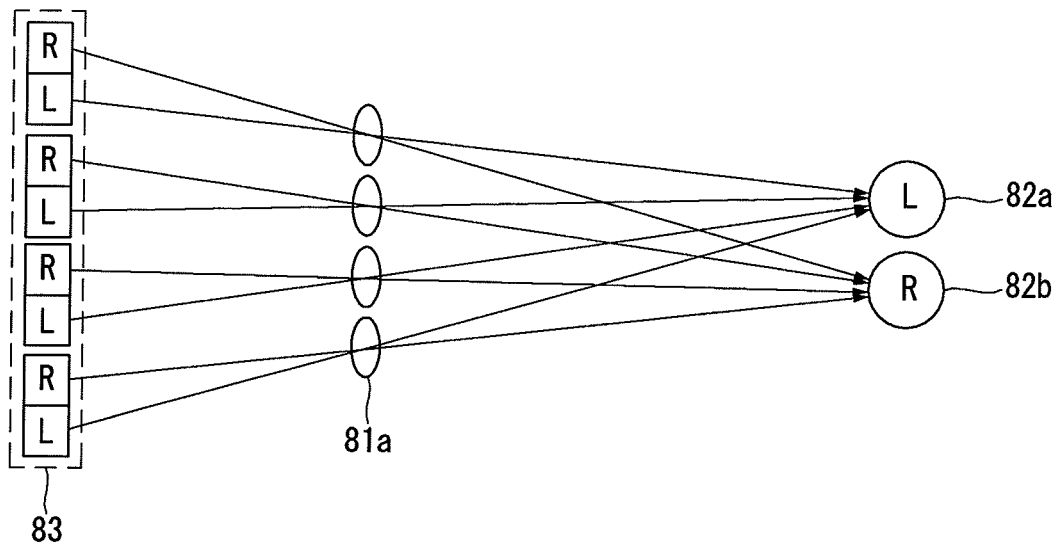
FIGS. 3 and 4 are diagrams illustrating a method of displaying a stereoscopic image using binocular parallax according to an exemplary embodiment of the present invention.
Figure 4:
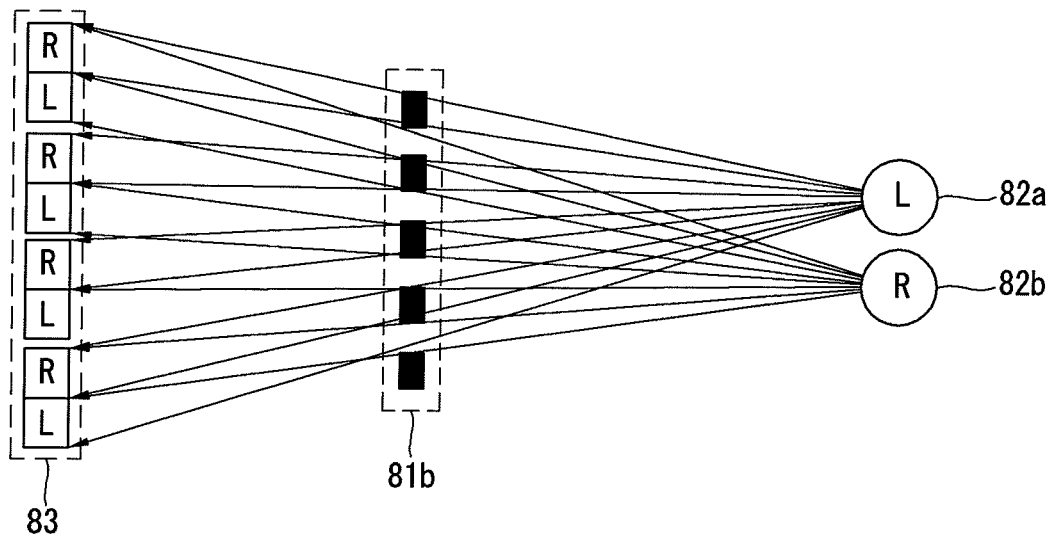

FIGS. 3 and 4 are views illustrating a method of displaying a stereoscopic image using binocular parallax according to an exemplary embodiment of the present invention. Specifically, FIG. 3 shows a scheme using a lenticular lens array, and FIG. 4 shows a scheme using a parallax barrier.

Binocular parallax (or stereo disparity) refers to the difference in vision associated with viewing an object between a human being's (user's or observer's) left and right eyes. When the user's brain combines an image viewed by the left eye and an image viewed by the right eye, the combined image appears stereoscopic to the user. Hereinafter, the phenomenon in which the image appears stereoscopic according to binocular parallax will be referred to as a 'stereoscopic vision', and an image causing a stereoscopic vision will be referred to as a 'stereoscopic image'. Also, when a particular object included in an image causes the stereoscopic vision, the corresponding object will be referred to as a 'stereoscopic object'.

A method for displaying a stereoscopic image according to binocular parallax is classified into a glass type method and a glassless type method. The glass type method may include a scheme using tinted glasses having wavelength selectivity, a polarization glass scheme using a light blocking effect according to a deviation difference, and a time-division glass scheme alternately providing left and right images within a residual image time of eyes. The glass type method may further include a scheme in which filters each having a different transmittance are mounted on left and right eyes and a cubic effect with respect to a horizontal movement is obtained according to a time difference of a visual system made from the difference in transmittance.

The glassless type method, in which a cubic effect is generated from an image display surface, rather than from an observer, includes a parallax barrier scheme, a lenticular lens scheme, a microlens array scheme, and the like.

With reference to FIG. 3, in order to display a stereoscopic image, a display module 151 includes a lenticular lens array 81a. The lenticular lens array 81a is positioned between a display surface 81 on which pixels (L) to be input to a left eye 82a and pixels (R) to be input to a right eye 82b are alternately arranged along a horizontal direction, and the left and right eyes 82a and 82b, and provides an optical discrimination directionality with respect to the pixels (L) to be input to the left eye 82a and the pixels (R) to be input to the right eye 82b. Accordingly, an image which passes through the lenticular lens array 81a is separated by the left eye 82a and the right eye 82b and thusly observed, and the user's brain combines (or synthesizes) the image viewed by the left eye 82a and the image viewed by the right eye 82b, thus allowing the user to observe a stereoscopic image.

With reference to FIG. 4, in order to display a stereoscopic image, the display module 151 includes a parallax barrier 81b in the shape of a vertical lattice. The parallax barrier 81b is positioned between a display surface 81 on which pixels (L) to be input to a left eye 82a and pixels (R) to be input to a right eye 82b are alternately arranged along a horizontal direction, and the left and right eyes 82a and 82b, and allows images are separately observed at the left eye 82a and the right eye 82b. Accordingly, the user's brain combines (or synthesizes) the image viewed by the left eye 82a and the image viewed by the right eye 82b, thus allowing the user to observe a stereoscopic image. The parallax barrier 81b is turned on to separate incident vision only in the case of displaying a stereoscopic image, and when a planar image is intended to be displayed, the parallax barrier 81b may be turned off to allow the incident vision to pass there through without being separated.

The foregoing concepts and methods for displaying a stereoscopic image are included herein merely to explain exemplary embodiments of the present invention, and the present invention is not meant to be limited thereto. Beside the foregoing methods, a stereoscopic image using binocular parallax may be displayed by using various other methods.

Figure 5:
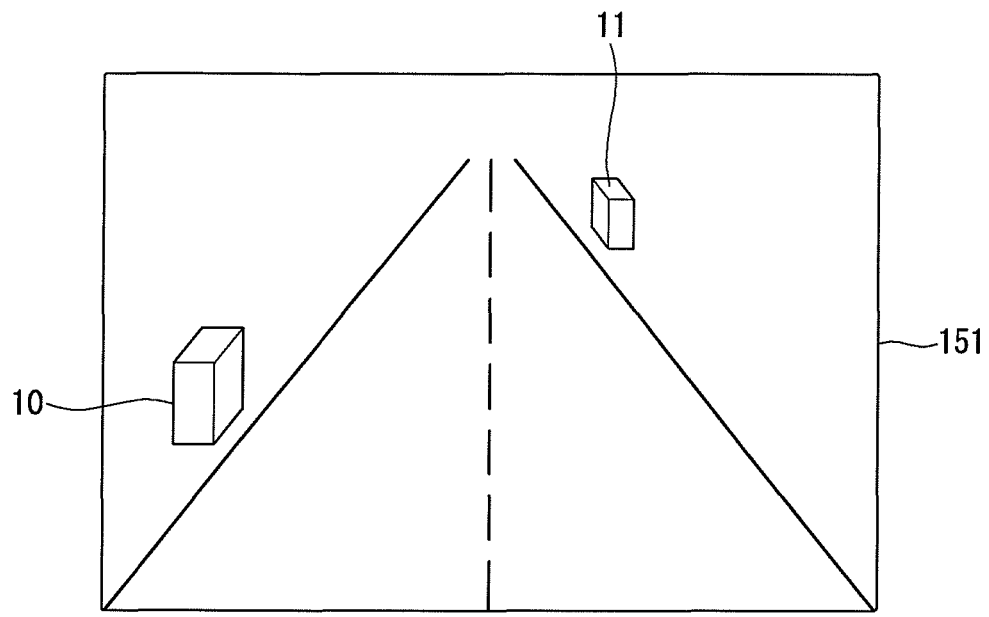
FIGS. 5 to 8 are diagrams illustrating a method of displaying a stereoscopic image according to exemplary embodiments of the present invention.

FIG. 5 illustrates an example of a stereoscopic image including a plurality of image objects 10 and 11.

For example, the stereoscopic image depicted in FIG. 5 may be an image obtained by the camera 121. The stereoscopic image includes a first image object 10 and a second image object 11. Here, it is assumed that there are two image objects 10 and 11 for ease of description; however, in practice, more than two image objects may be included in the stereoscopic image.

The controller 180 may display an image acquired in real time by the camera 121 on the display unit 151 in the form of a preview.

The controller 180 may acquire one or more stereo disparities respectively corresponding to one or more of the image objects in operation S110.

In the case where the camera 121 is a 3D camera capable of acquiring an image for the left eye (hereinafter, referred to as "a left-eye image") and an image for the right eye (hereinafter, referred to as "a right-eye image"), the controller 180 may use the acquired left-eye and right-eye images to acquire the stereo disparity of each of the first image object 10 and the second image 11.

Figure 6:
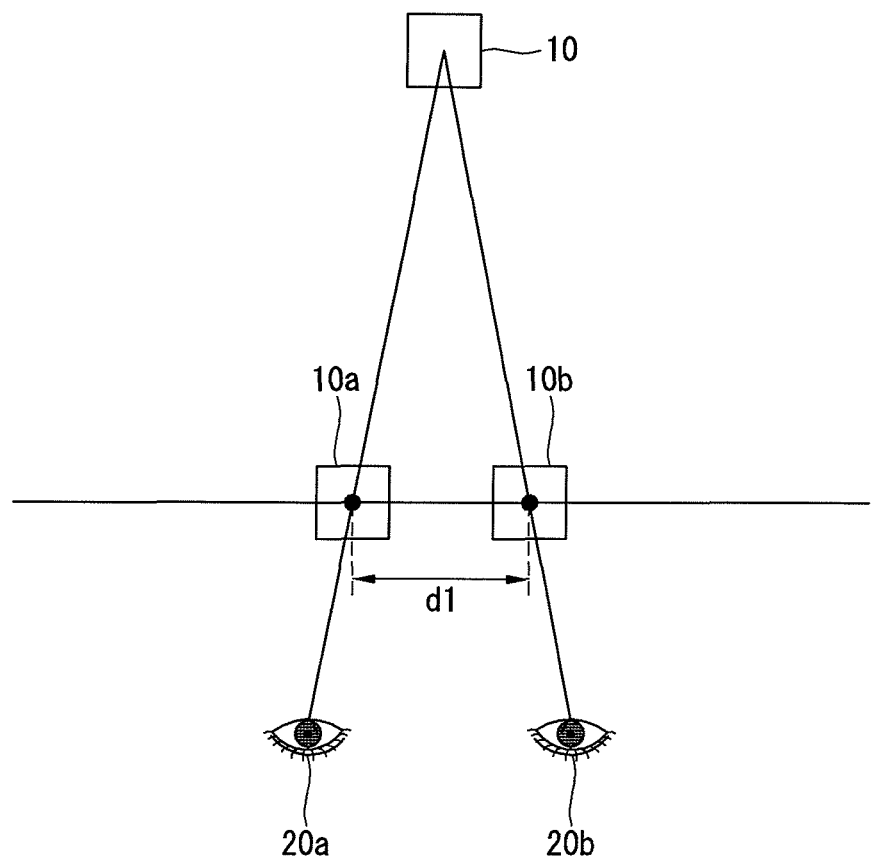

FIG. 6 is a view for explaining a stereo disparity of an image object included in a stereoscopic image.

For example, referring to FIG. 6, the first image object 10 may have a left-eye image 10a presented to the user's left eye 20a, and a right-eye image 10b presented to the right eye 20b.

The controller 180 may acquire a stereo disparity d1 corresponding to the first image object 10 on the basis of the left-eye image 10a and the right-eye image 10b.

In the case where the camera 121 is a 2D camera, the controller 180 may convert a 2D image, acquired by the camera 121, into a stereoscopic image by using a predetermined algorithm for converting a 2D image into a 3D image, and display the converted image on the display unit 151.

Furthermore, by using left-eye and right-eye images created by the above image conversion algorithm, the controller 180 may acquire the respective stereo disparities of the first image object 10 and the second image object 11.

Figure 7:
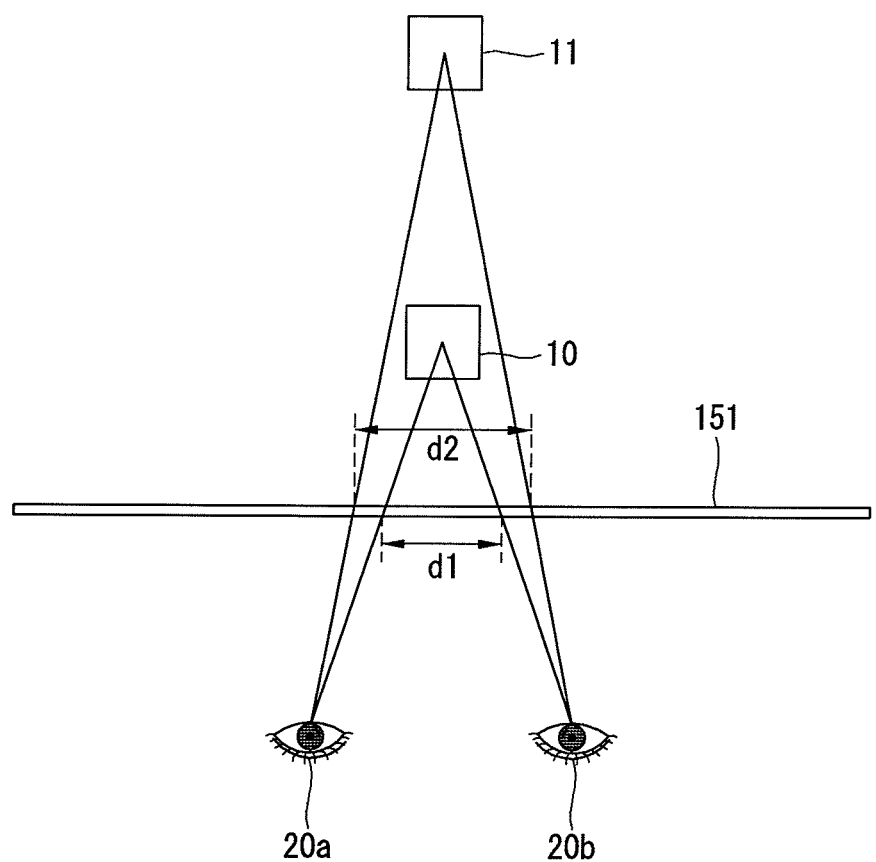

FIG. 7 is a view for comparing the stereo disparities of the image objects 10 and 11 depicted in FIG. 5.

Referring to FIG. 7, the stereo disparity d1 of the first image object 10 is different from a stereo disparity d2 of the second image object 11. Furthermore, as shown in FIG. 7, since the stereo disparity d2 of the second image object 11 is greater than the stereo disparity d1 of the first image object 10, the second image object 11 is viewed as if being located farther away from the user than the first image object 10.

The controller 180 may acquire one or more graphic objects respectively corresponding to one or more of the image objects in operation. The controller 180 may display the acquired one or more graphic objects on the display unit 151 so as to have a stereo disparity.

Figure 8:
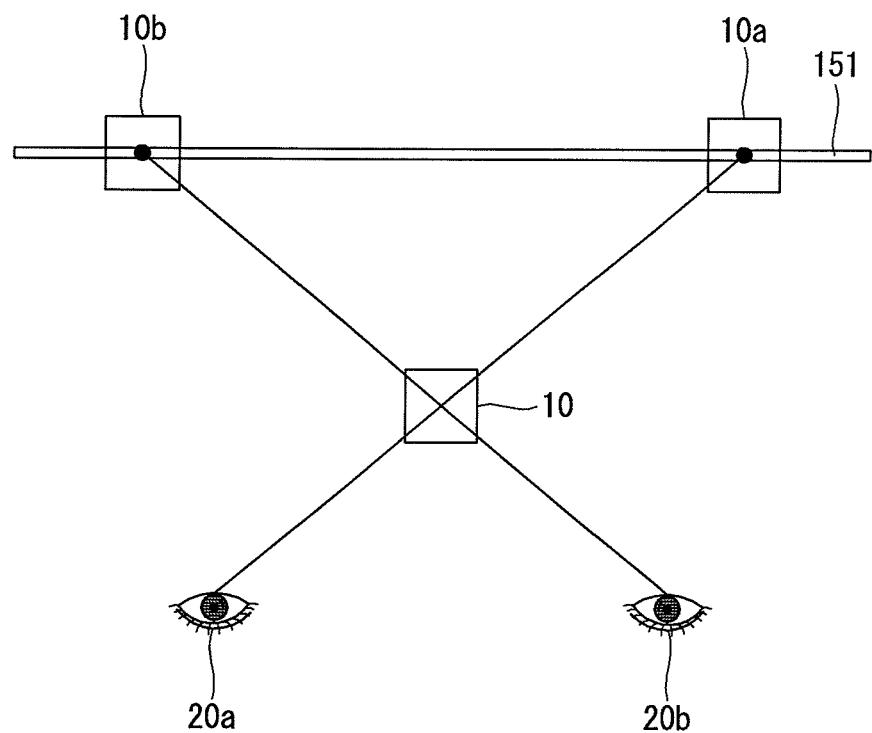

FIG. 8 illustrates the first image object 10 that may look as if protruding toward the user. As shown in FIG. 8, the locations of the left-eye image 10a and the right-eye image 10b on the display unit 151 may be opposite to those depicted in FIG. 6. When the left-eye image 10a and the right-eye image 10b are displayed in the opposite manner as above, the images are also presented to the left eye 20a and the right eye 20b in the opposite manner. Thus, the user can view the displayed image as if it is located in front of the display unit 151, that is, at the intersection of sights. That is, the user may perceive positive (+) depth in relation to the display unit 151. This is different from the case of FIG. 6 in which the user perceives negative (−) depth that gives the user an impression that the first image object 10 is displayed at the rear of the display unit 151.

The controller 180 may give the user the perception of various types of depth by displaying a stereoscopic image having positive (+) or negative depth (−) according to needs.

Hereinafter, a method of displaying a three-dimensional image according to an exemplary embodiment of the present invention will be described.

Figure 9:
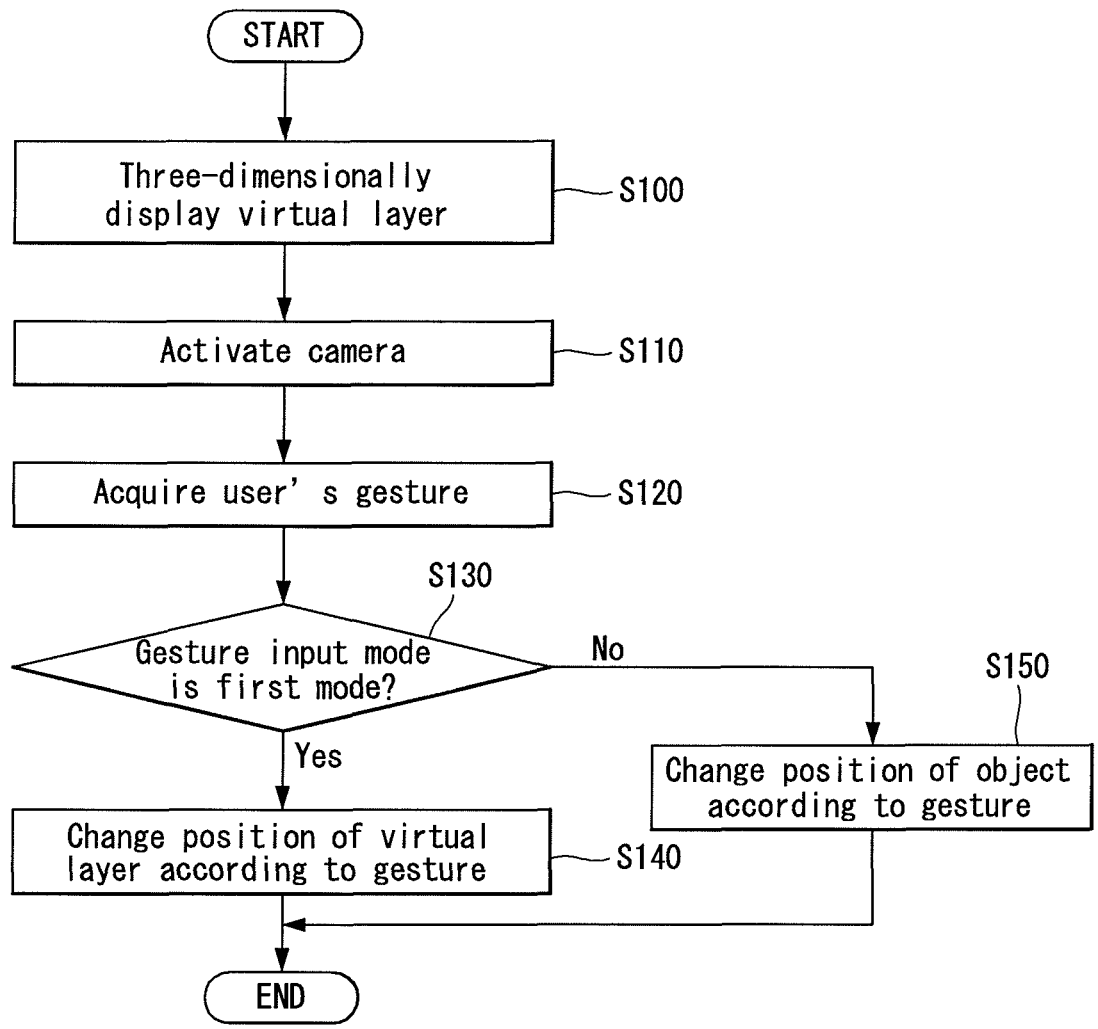
FIG. 9 is a flowchart illustrating a method of displaying a three-dimensional image according to an exemplary embodiment of the present invention according to an exemplary embodiment of the present invention.

FIG. 9 is a flowchart illustrating a method of displaying a three-dimensional image according to an exemplary embodiment of the present invention. The method of FIG. 9 may be performed by the device of FIGS. 1-2.

As shown in FIG. 9, a method of displaying a three-dimensional image according to an exemplary embodiment of the present invention includes at least one of three-dimensionally displaying a virtual layer (S100), activating a camera (S110), acquiring a user's gesture (S120), determining whether or not a gesture input mode corresponds to a first mode of operation (S130), if the gesture input mode does correspond to the first mode of operation, changing a position of a virtual layer according to a gesture (S140), and, if the gesture input mode does not correspond to the first mode of operation, changing a position of an object according to a gesture (S150). Hereinafter, a method of displaying a three-dimensional image according to an exemplary embodiment of the present invention will be described in detail on a step basis.

The electronic device 100 three-dimensionally displays a virtual layer including at least one icon object (S100). The icon objects correspond to various functions of the electronic device 100, various applications installed at the electronic device 100, and phone numbers stored at the electronic device 100, and when an icon object is selected, each function corresponding thereto can be executed.

FIGS. 10 and 11 are diagrams illustrating examples of displaying an icon object on three-dimensional space according to an exemplary embodiment of the present invention. The concepts of FIGS. 10-11 may be performed by the devices of FIGS. 1-2.

Referring to FIG. 10, the electronic device 100 displays multiple virtual layers L1, L2, L3, and L4 three-dimensionally. The virtual layers L1, L2, L3, and L4 may include a plurality of icon objects OB. The virtual layers L1, L2, L3, and L4 may be displayed with different depths, as shown in FIG. 10(a). FIG. 10(a) illustrates the virtual layers L1, L2, L3, and L4 displayed between the display unit 151 and the user U, and thus a user may feel a positive (+) depth impression, as described above. However, the display unit 151 may also display the virtual layers L1, L2, L3, and L4 so that the user feels a negative (−) depth impression, as described above.

FIG. 10(b) illustrates a view provided to the user U when the user U shown in FIG. 10(a) views the virtual layers L1, L2, L3, and L4. As shown in FIG. 10(b), the virtual layer L1 (hereinafter, a top level virtual layer) displayed in a virtual upper level of the virtual layers L1, L2, L3, and L4 may be most clearly displayed, and the remaining virtual layers L2, L3, and L4 may be displayed more dimly than the top level virtual layer L1. For example, the remaining virtual layers L2, L3, and L4 may be dimmed and displayed. When the electronic device 100 displays the remaining virtual layers L2, L3, and L4, as the electronic device 100 recedes from the user U, the remaining virtual layers L2, L3, and L4 may be dimmed and displayed. Further, when the electronic device 100 displays the remaining virtual layers L2, L3, and L4, as the electronic device 100 recedes further from the user U, the remaining virtual layers L2, L3, and L4 may be displayed smaller. Thereby, the electronic device 100 enables the user to feel perspective and thus can display a three-dimensional image of a more stereoscopic impression.

Referring to FIG. 11, as described with reference to FIG. 10, the electronic device 100 displays at least one virtual layer L1, L2, L3, and L4 three-dimensionally displayed, and the virtual layers L1, L2, L3, and L4 include a plurality of icon objects OB. In this case, the virtual layers L1, L2, L3, and L4 may be displayed with different depths, as shown in FIG. 11(*a*), and some virtual layers L2 and L3 may be displayed with the same depth. The electronic device 100 assumes a virtual circle or oval C and disposes the virtual layers L1, L2, L3, and L4 so that the center of each of the virtual layers L1, L2, L3, and L4 may be positioned on the virtual circle or oval.

FIG. 11(*b*) illustrates a view provided to the user U when the user U shown in FIG. 11(*a*) views the virtual layers L1, L2, L3, and L4. As shown in FIG. 11(*b*), the top level virtual layer L1 of the virtual layers L1, L2, L3, and L4 may be most clearly displayed, and the remaining virtual layers L2, L3, and L4 may be displayed more dimly than the top level virtual layer L1. For example, the remaining virtual layers L2, L3, and L4 may be dimmed and displayed. When the electronic device 100 displays the remaining virtual layers L2, L3, and L4, as the electronic device 100 recedes from the user U, the remaining virtual layers L2, L3, and L4 are dimmed and displayed. Further, when the electronic device 100 displays the remaining virtual layer L2, L3, and L4, as the electronic device 100 recedes from the user U, the remaining virtual layers L2, L3, and L4 may be displayed smaller. Thereby, the electronic device 100 can display a three-dimensional image of a more stereoscopic impression so that the user feels perspective. Further, unlike displaying all virtual layers L1, L2, L3, and L4 with different depths on a straight line, as shown in FIG. 10, to display the virtual layers L1, L2, L3, and L4 on a circle or an oval allows the user to more easily identify an icon object OB included on the remaining virtual layers, as shown in FIG. 10.

Referring again to FIG. 9, a method of displaying a three-dimensional image according to an exemplary embodiment of the present invention will be described.

The electronic device 100 activates a camera (S110). Step S110 may be performed after step S100 is performed, may be performed together with step S100, and may be performed before step S100 is performed. That is, a performing order between step S100 and step S110 is not limited to that shown in FIG. 9.

The camera 121 may be selectively activated. For example, when it is necessary to acquire a gesture of a user U, the camera 121 may be activated. Further, when a plurality of cameras 121 exists, only some cameras may be selectively activated. For example, in a normal environment, a 2D camera may be activated, and in a situation in which a specific user's gesture should be photographed, a 3D camera may be activated.

Thereafter, the electronic device 100 acquires a user's gesture (S120). An input of a user's gesture was described in detail with reference to FIG. 2 and thus a detailed description thereof will be omitted.

Thereafter, the electronic device 100 determines a preset gesture input mode (S130). For example, the electronic device 100 determines whether a gesture input mode presently set to the electronic device 100 is a first mode or a second mode.

Here, the first mode is a mode that can change a position of at least one of virtual layers L1, L2, L3, and L4 three-dimensionally displayed. A change of a position of a virtual layer is a change of at least one parameter for determining a position of a virtual layer at three-dimensional space.

Figure 12:
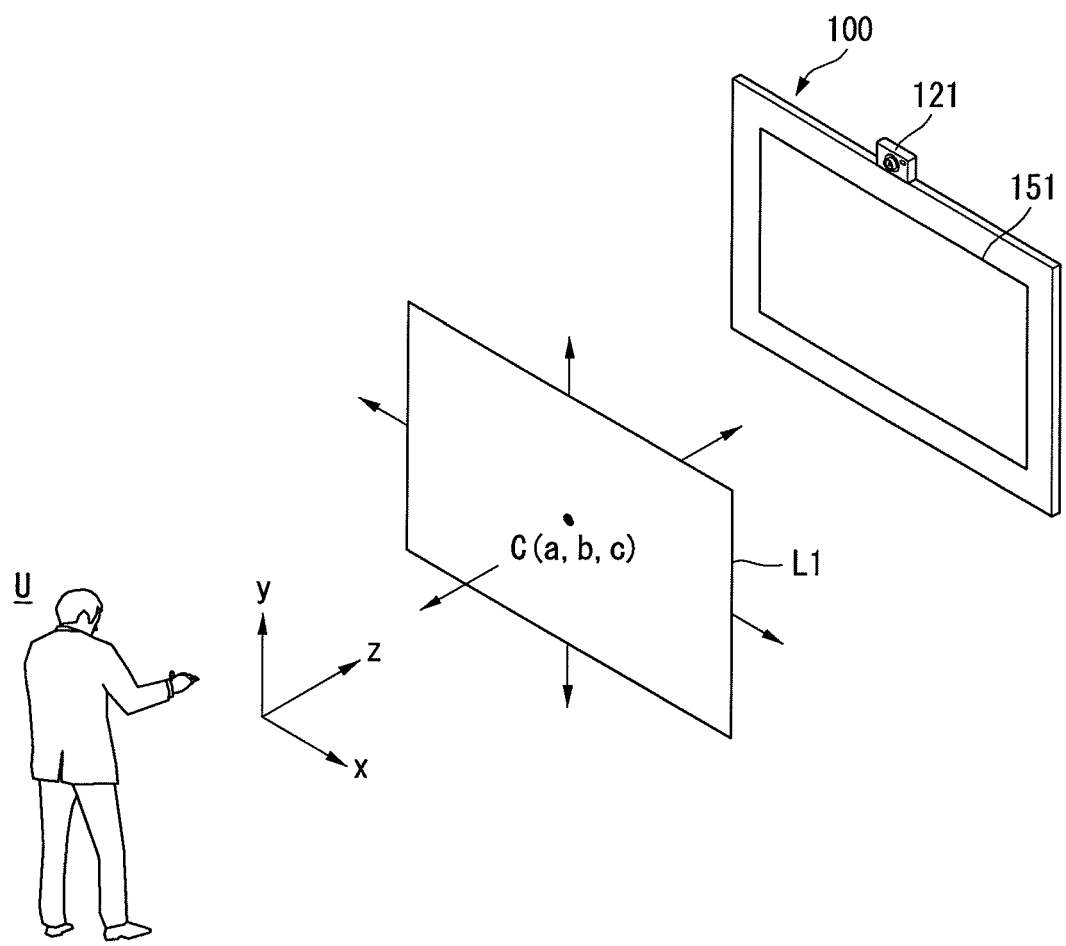
FIG. 12 is a diagram illustrating an example of changing a position of a virtual layer on three-dimensional space according to an exemplary embodiment of the present invention.

For example, referring to FIG. 12 illustrating an example of changing a position of a virtual layer on three-dimensional space according to an exemplary embodiment of the present invention, when a three-dimensional orthogonal coordinate system of x-axis, y-axis, and z-axis (for convenience, it is assumed that an xy-plane formed by x-axis and y-axis is parallel to a virtual layer, and it is assumed that z-axis is perpendicular to the xy-plane) is assumed, by changing at least one of coordinate values a, b, and c of one point (for example, a central point C of a virtual layer) included in the virtual layer L1, a position of the virtual layer L1 may be changed. That is, a change of a value a is a lateral change of a position of a virtual layer L1, a change of a value b is a vertical change of a position of a virtual layer L1, and a change of a value c is a change of a depth value of a virtual layer L1.

The second mode is a mode that can change a position of at least one of icon objects OB included in a virtual layer. A change of a position of an icon object may be at least one of (1) a change of a position thereof to a right side, a left side, an upper side, and a lower side on one virtual layer and (2) a change of a position thereof from a virtual layer in which an icon object is included to another virtual layer.

Figure 13:
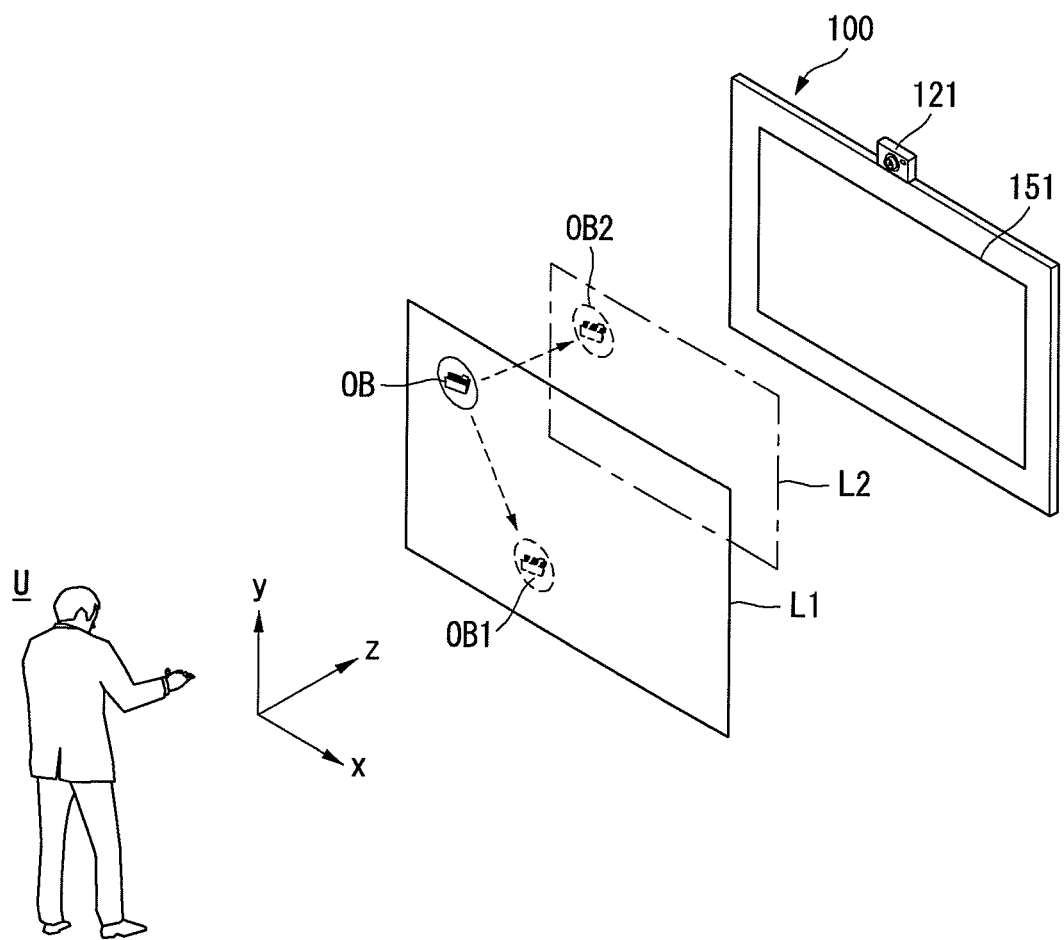
FIG. 13 is a diagram illustrating an example of changing a position of an icon object on three-dimensional space according to an exemplary embodiment of the present invention.

For example, referring to FIG. 13 illustrating an example of changing a position of an icon object on three-dimensional space according to an exemplary embodiment of the present invention, when a three-dimensional orthogonal coordinate system of x-axis, y-axis, and z-axis is assumed, an icon object OB may be moved to a position OB1 or to a position OB2 of another virtual layer L2 on one virtual layer L1. A position change of a virtual layer and/or a position change of an icon object will be described later in detail through a description of step S140 and/or step S150.

A gesture input mode of the electronic device 100 can be set by various methods, and hereinafter, this will be described in detail.

In one embodiment, a gesture input mode may be set by a user's specific gesture. For example, when at least one virtual layer including at least one icon object OB is output on three-dimensional space, if the user U makes no preset specific gesture, a gesture input mode of the electronic device 100 may be set as the first mode. In this case, if the user U makes a preset specific gesture, a gesture input mode of the electronic device 100 may be changed to the second mode.

Alternatively, when the user U makes no preset specific gesture, a gesture input mode of the electronic device 100 may be set as the second mode, and when the user U makes a preset specific gesture, a gesture input mode of the electronic device 100 may be set as the first mode. When a preset gesture corresponding to each of the first mode and the second mode exists and the user U makes a preset gesture, the electronic device 100 sets a gesture input mode to an input mode corresponding thereto.

When a gesture input mode is set by the user's specific gesture, an example of operation of the electronic device 100 is described as follows. As described with reference to FIGS. 10 and 11, the electronic device 100 can output at least one virtual layer that may include an icon object to three-dimensional space. This enables the user to visually check various functions and/or applications that can be executed in the electronic device 100 and enables the user to select a desired function and/or application. In this case, a plurality of virtual layers may exist, and the user U can change a position of a virtual layer by a desired level in order to select a virtual layer (for example, in order to display a corresponding virtual layer in a highest level) including an icon object corresponding to a function or an application to execute in the electronic device 100 (a state that is set to the first mode). In this case, when a virtual layer including an icon object corresponding to a function and/or an application in which the user U tries to execute is selected (for example, when a corresponding virtual layer is displayed in a highest level), the user U can no longer want a position change of an virtual layer by a gesture and want a selection or a position change of an icon object, and when the user U makes a preset specific gesture in order to perform such an input (change setting to the second mode), a position of the virtual layer is no longer changed by the user's gesture, and a selection, execution, and/or a position change of the icon object may be performed as a function corresponding to a gesture of the user U. As described above, by moving a position of a virtual layer or a position of an icon object included in a virtual layer according to a gesture input mode, the user can more easily execute various functions and/or applications provided through the electronic device 100 and edit a three-dimensional graphic interface with various methods.

FIG. 14 is a diagram illustrating an example of changing a gesture input mode from a first mode to a second mode by a user's gesture.

Referring to FIG. 14, the user (not shown) takes a gesture such as holding a virtual layer with fingers (particularly, a thumb and an index finger in the drawing) of a hand H. As shown in FIG. 14, when the user U makes a preset gesture, the electronic device 100 changes a gesture input mode from the first mode to the second mode. That is, thereafter, according to a gesture in which the user U makes, a position of a virtual layer is no longer changed, and a position of an icon object OB included in a virtual layer in a highest level can be changed. The gesture shown in FIG. 14 is an example of a preset gesture for changing a gesture input mode, and the present invention is not limited thereto. For example, in a first mode state, various gestures such as a gesture in which the user U clenches a fist and/or a gesture in which the user U spreads all fingers can be preset as a gesture used for changing an input mode.

Similarly, to a change of a gesture input mode from the first mode to the second mode, when the user U makes a preset specific gesture in a second mode state, the gesture input mode that is set at the electronic device 100 can be changed again to the first mode.

Alternatively, the second mode can be sustained when the user U makes a preset specific gesture in order to change a gesture input mode from the first mode to the second mode. For example, the gesture input mode is set to the second mode only when the user U continuously sustains a gesture shown in FIG. 14, and when the user no longer takes a gesture shown in FIG. 14, the gesture input mode is returned and set to the first mode.

Additionally, a gesture input mode may be set based on a previously selected object. For example, when a virtual layer is previously selected by an input of the user U, the gesture input mode may be set to the first mode, and when an icon object is previously selected by an input of the user U, the gesture input mode may be set to the second mode. Various methods of pre-selecting the virtual layer and/or the icon object may be employed. For example, pre-selection of the virtual layer and/or the icon object may be performed by a gesture of the user U, but may be performed through an input interface other than a gesture input.

An example of pre-selecting the virtual layer and/or the icon object through a gesture will be described with reference to FIG. 15. As shown in FIG. 15(a), when the user U makes a gesture in which the user's finger indicates a blank portion of a virtual layer L at which an icon object OB is not positioned, the virtual layer L may be previously selected by such a gesture. As shown in FIG. 15(b), when the user U makes a gesture in which the user's finger indicates a position of a specific icon object OB, the specific icon object OB may be selected by such a gesture.

As shown in FIG. 15(a), after the virtual layer L is previously selected by the user's gesture, when a second gesture of the user is input, the electronic device 100 changes a position of a previously selected virtual layer L according to the second gesture. Further, as shown in FIG. 15(b), after the icon object OB is previously selected by the user's gesture, when a third gesture of the user is input, the electronic device 100 changes a position of a previously selected virtual object OB according to the third gesture.

Third, the gesture input mode may be set through an input interface other than a gesture. For example, the gesture input mode may be set by a user input through a remote control and an input through voice of the user U.

Figure 16:
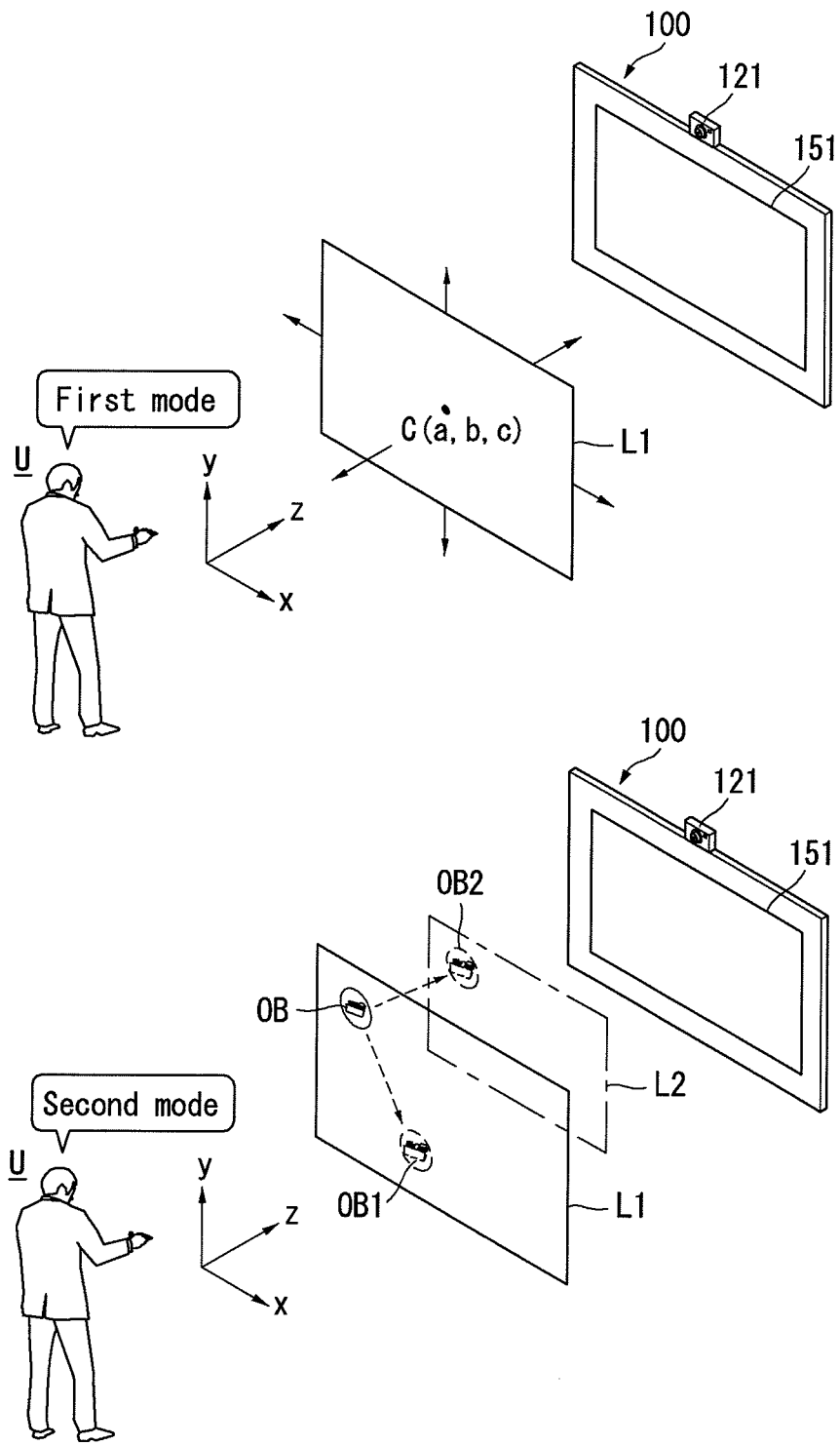
FIG. 16 is a diagram illustrating an example of setting a gesture input mode by a voice input of a user according to an exemplary embodiment of the present invention.

FIG. 16 is a diagram illustrating an example of setting a gesture input mode by a voice input of a user. As shown in FIGS. 16(a) and 16(b), the gesture input mode may be changed by a voice command of the user. However, in the present invention, a voice command for changing and/or setting a gesture input mode is not limited to a command shown in a speech balloon of FIG. 16, and various voices can be set as a voice command for changing and/or setting a gesture input mode.

Referring again to FIG. 9, a method of displaying a three-dimensional image according to an exemplary embodiment of the present invention will be described.

After step S130 is performed, the electronic device 100 selectively changes a position of a virtual layer (S140) or a position of an object (S150) according to a gesture. The gesture may be a gesture acquired at step S120.

Hereinafter, step S140 of changing a position of a virtual layer according to a gesture of a user U will be described.

FIGS. 17 and 18 are diagrams illustrating a change of a position of a virtual layer according to a gesture.

When a position of a virtual layer is changed according to a gesture of a user U, a position of the virtual layer may be changed to a random position of three-dimensional space embodied by the display unit 151. That is, a position at which the virtual layer can be positioned on the three-dimensional space may continuously exist. For example, as shown in FIG. 17, when the user U makes a gesture that moves a hand from a first point P1, which is a starting point of a hand gesture, to a second point, which is an ending point P2 of a hand gesture, the virtual layer L can move to the right side by a distance corresponding to a separation distance between the first point P1 and the second point P2, as shown in FIG. 18. That is, a position of the virtual layer L may exist not only on a predetermined orbit but also be changed to a random point calculated and determined in consideration of a speed, a moving distance, and a moving direction of the user's gesture. In this case, the layer L may change a depth value thereof to correspond to the user's gesture as well as a position change to a right side, a left side, an upper side, and a lower side.

However, when a position of the virtual layer can be positioned at a random position, the degree of freedom of a function viewpoint in which a user feels may increase, but it may be difficult for the user to easily embody a function.

When a position of a virtual layer is changed according to a gesture of the user U, the virtual layer may exist only on a predetermined orbit on the three-dimensional space. Alternatively, when a position of a virtual layer is changed according to a gesture of the user U, the virtual layer may discretely exist only on a predetermined point on the three-dimensional space. That is, a position at which the virtual layer may be positioned on the three-dimensional space may exist discontinuously. This will be described in detail with reference to FIGS. 19 and 20.

Figure 19:
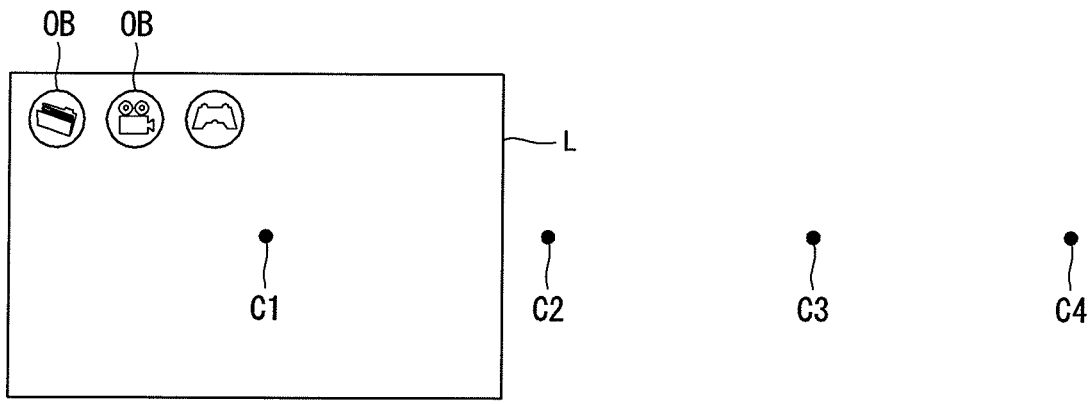
FIGS. 19 and 20 are diagrams illustrating an example of specific points at which a virtual layer is positioned according to an exemplary embodiment of the present invention.
Figure 20:
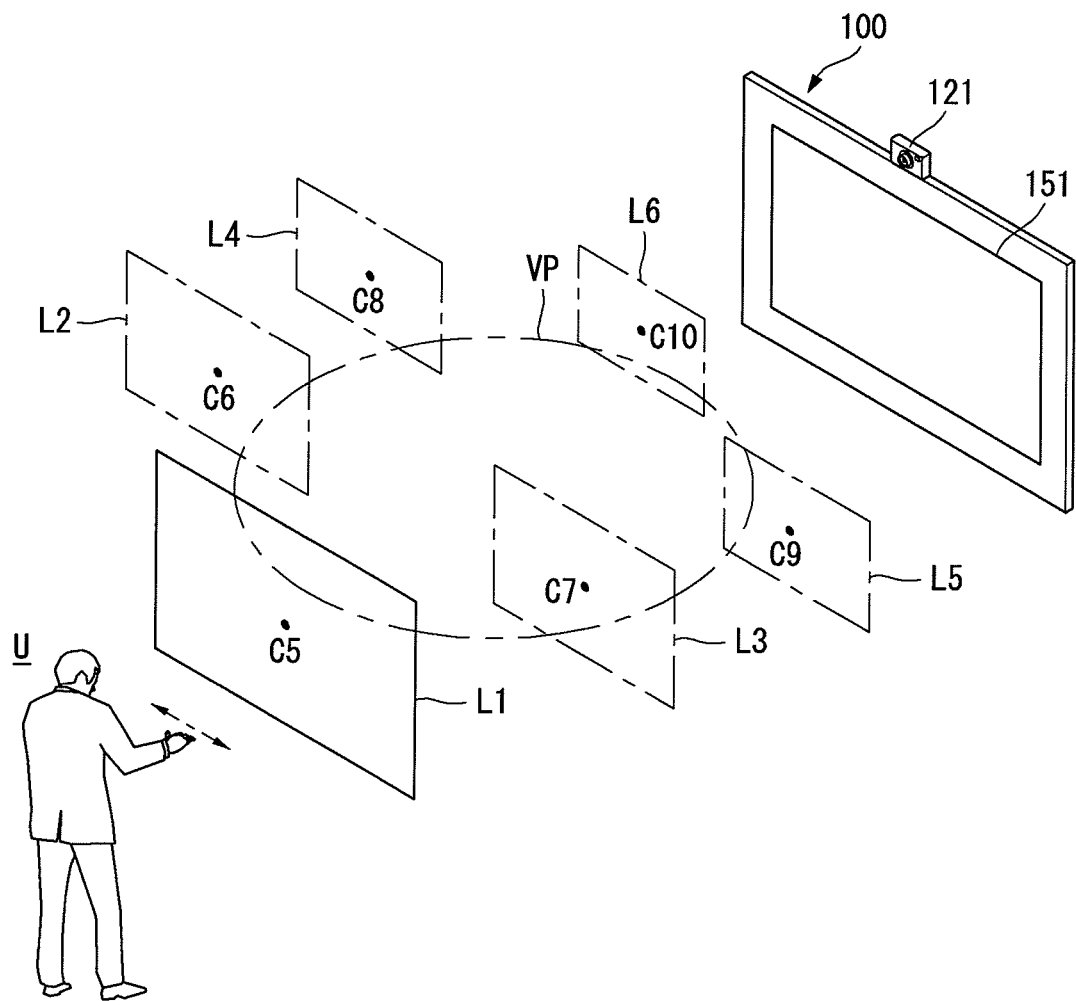

FIGS. 19 and 20 are diagrams illustrating an example of specific points at which a virtual layer is positioned according to an exemplary embodiment of the present invention.

As shown in FIG. 19, a central point of the virtual layer may exist only at a predetermined specific position. Further, a central point of the virtual layer may exist only at specific points C5, C6, C7, C8, C9, and C10 existing on a specific geometrical orbit VP such as a circle (or an oval) on three-dimensional space, as shown in FIG. 20. In this way, when a virtual layer exists only on a predetermined point on three-dimensional space, the degree of freedom of the user may be lowered, compared with a case where a virtual layer may exist at a random position on three-dimensional space, as described above, but there is a merit that the user can more easily embody a function.

As shown in FIG. 20, when specific points are disposed on a virtual orbit, the electronic device 100 determines positions of virtual layers according to the number of virtual layers displayed through the display unit 151. This will be described with reference to FIG. 21.

FIG. 21 is a diagram illustrating an example of determining positions of specific points at which a virtual layer is positioned on a virtual orbit according to an exemplary embodiment of the present invention.

Referring to FIG. 21, when six virtual layers should be displayed one time through the display unit 151, the electronic device 100 determines a position of total 6 specific points on a virtual orbit VP, as shown in FIG. 21(*a*), and when the number of virtual layers to be displayed is 8, the electronic device 100 determines positions of total 8 specific points on a virtual orbit VP, as shown in FIG. 21(*b*).

When a position of one virtual layer is changed according to step S140, positions of other virtual layers are also changed. That is, as a position of one virtual layer is changed, positions of other virtual layers may be also changed, but relative positions of other virtual layers to one virtual layer may not be changed. Here, relative positions of other virtual layers to one virtual layer may be at least one of a distance between one virtual layer and other virtual layers and an angle relative to the center of the virtual orbit.

For example, as shown in FIG. 20, when virtual layers L1, L2, L3, L4, L5, and L6 are displayed in three-dimensional space, if the user U makes a gesture shown in FIG. 17, a virtual layer L1 positioned at C5 moves to a position C7, and thus a virtual layer L3 positioned at C7 moves to a position C9, a virtual layer L5 positioned at C9 moves to a position C10, a virtual layer L6 positioned at C10 moves to a position C8, a virtual layer L4 positioned at C8 moves to a position C6, and a virtual layer L2 positioned at C6 moves to a position C5.

For convenience of description, as shown in FIG. 17, a case where the user U makes a hand gesture advancing from the left side to the right side is described, but a hand gesture is not limited thereto, and in a case where the user U performs a hand gesture advancing from the right side to the left side, positions of each virtual layer are changed in a direction opposite to the above-described direction.

Further, a case where virtual layers move to a next position of each step (from C5 to C7, or from C7 to C9) by a gesture of the user U is described, but virtual layers can move to a next position of 1 step or more according to an attribute (for example, a speed and a length) of a gesture of the user U. For example, the virtual layer L1 positioned at C5 may move to a position C9 by the user's gesture. That is, the electronic device 100 analyzes an input gesture of the user, and when determining a position at which a virtual layer is to be moved, the electronic device 100 considers various attributes of the user's gesture.

The electronic device 100 can set various critical values of each attribute when analyzing the user's gesture.

For example, when a critical value of a moving distance of the user's gesture is set to 5, the electronic device 100 analyzes a moving distance of the user's gesture, and when the moving distance of the user's gesture has a value less than 5, a position of the virtual layer may not move. When the moving distance of the user's gesture has a value of 5 or more and less than 10, the electronic device 100 can move a position of each virtual layer to a next position, as described above. Further, when the moving distance of the user's gesture has a value of 10 or more and less than 15, the electronic device 100 can move a position of the virtual layer by two levels. Even when the moving distance of the user's gesture has a value of 10 or more, the above-described description can be applied thereto.

In another example, when a critical value of a speed of the user's gesture is set to 5, the electronic device 100 analyzes a speed of the user's gesture, and when the speed of the user's gesture has a value less than 5, a position of a virtual layer may not move. When the speed of the user's gesture has a value of 5 or more and less than 10, the electronic device 100 can move a position of each virtual layer to a next position, as described above. Even when the speed of the user's gesture has a value of 10 or more, the above-described description can be applied thereto.

When changing a position of the virtual layer according to the user's gesture, the electronic device 100 may consider not only one attribute of the user's gesture but also a plurality of attributes. For example, the electronic device 100 may consider both a moving distance and a speed attribute of the user's gesture. In this case, when the moving distance of the user's gesture does not exceed the above-described critical value, but when the moving distance of the user's gesture exceeds the above-described critical value, the electronic device 100 can change a position of the virtual layer.

The electronic device 100 may also provide an animation effect, such as movement of the virtual layer to correspond to a real time action of the user's gesture to the virtual layer according to the user's gesture. In this case, when an attribute of the user's gesture does not exceed a critical value that is set thereto, an animation effect in which the virtual layer moves to a next position and returns again to an original position according to movement of the user's gesture can be applied.

Another example of a method of changing a position of a virtual layer according to the user's gesture may exist. This will be described with reference to FIGS. 22 and 23.

Figure 22:
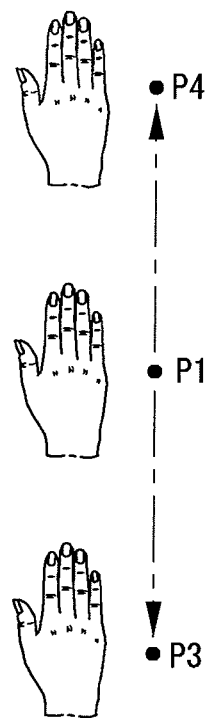
FIGS. 22 and 23 are diagrams illustrating a change of a position of a virtual layer with a gesture according to an exemplary embodiment of the present invention.
Figure 23:
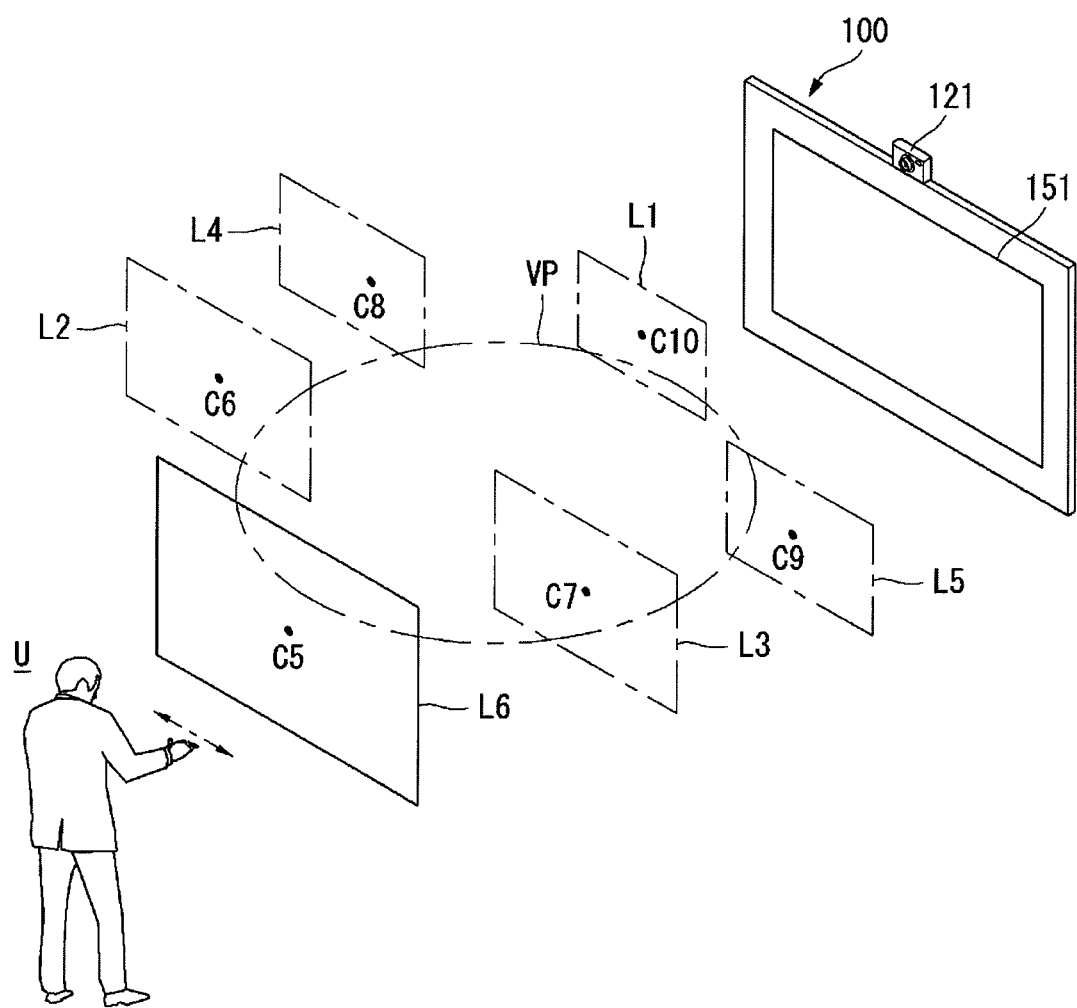

FIGS. 22 and 23 are diagrams illustrating a change of a position of a virtual layer with a gesture according to an exemplary embodiment of the present invention.

As shown in FIG. 22, when virtual layers are displayed in three-dimensional space, when the user U makes a downward gesture advancing from a first point P1, which is a starting point to a third point P3, which is an ending point, or a upward gesture advancing from a first point P1, which is a starting time point to a fourth point P4, which is an ending point, a position of virtual layers can be changed, as shown in FIG. 23. That is, a virtual orbit rotates about a virtual rotation axis passing through a central point of a virtual orbit VP, and thus a position of each virtual layer can be changed. Accordingly, a virtual layer L1 that has been at C5, which is a virtual upper level position in FIG. 20 can be moved to a position C10, which is a lowest level position, as shown in FIG. 23, and alternatively, a virtual layer L6 that has been at C10, which is a lowest level position can be moved to a position C5, which is a highest level position.

In the foregoing description, a change of a position of a virtual layer according to step S140 was described. According to exemplary embodiments of the present invention, when a position of a virtual layer is moved by a user's gesture, the electronic device 100 can provide an animation effect so that a position movement of a virtual layer may be naturally displayed to the user, and when an attribute (for example, a speed or a moving distance) of the user's gesture does not exceed a critical value by analysis of the user's gesture, a position of a virtual layer may not be changed. Further, the user's gesture for a position change of the virtual layer may be different than the above-described gestures, and it will become apparent to a person of ordinary skill in the art that moving positions of virtual layers corresponding to each gesture may be differently designed.

Hereinafter, after step S130 is performed, step S150 of changing a position of an icon object according to a gesture of the user U will be described.

As described above, a change of a position of an icon object according to the user's gesture may include both movement of an icon object within one virtual layer (hereinafter, a first object moving action) and movement of an icon object from one virtual layer to another virtual layer (hereinafter, a second object moving action). Therefore, the electronic device 100 should determine to perform the first object moving action or to perform the second object moving action according to preferably, the user's gesture. The electronic device 100 can use various methods in order to perform the determination. A description thereof will be described in detail with reference to FIGS. 24 to 32.

Figure 24:
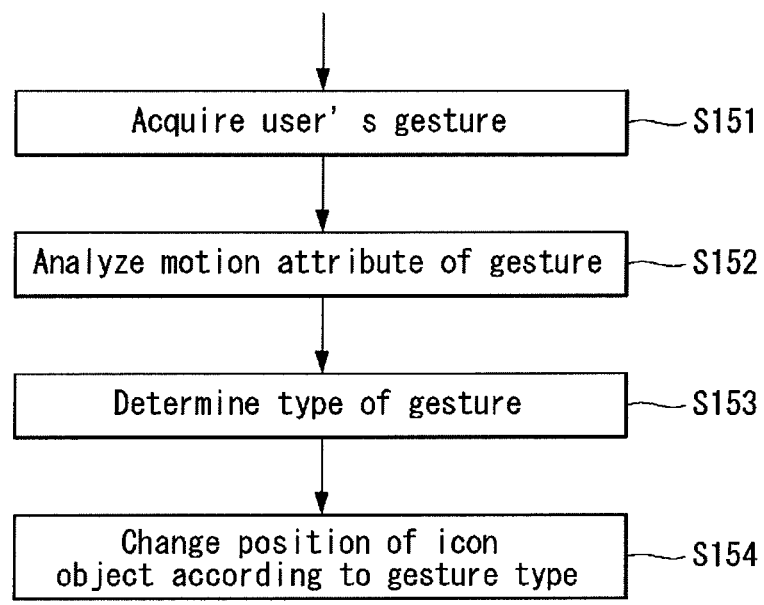
FIG. 24 is a flowchart illustrating a method of changing a position of an icon object according to an exemplary embodiment of the present invention.

FIG. 24 is a flowchart illustrating a method of changing a position of an icon object according to an exemplary embodiment of the present invention. The method of FIG. 24 may be performed by the devices of FIGS. 1-2.

FIGS. 25 to 30 are diagrams illustrating a method of changing a position of an icon object with a gesture according to an exemplary embodiment of the present invention. FIG. 31 is a flowchart illustrating a method of changing a position of an icon object according to an exemplary embodiment of the present invention, and FIG. 32 is a diagram illustrating a method of changing a position of an icon object according to an exemplary embodiment of the present invention.

According to an exemplary embodiment of the present invention, as shown in FIG. 24, the electronic device 100 performs at least one of step of acquiring a user's gesture (S151), step of analyzing a motion attribute of a gesture (S152), step of determining a type of a gesture (S153), and step of changing a position of an icon object according to a gesture type (S154), thereby determining to perform the first object moving action, or to perform the second object moving action.

Step S151 corresponds to step S120, and a user's gesture acquired at step S151 may be a gesture different from the user's gesture acquired at step S120.

The electronic device 100 analyzes a motion attribute of the user's gesture acquired at step S151 (or step S120) (S152). For example, the electronic device 100 may analyze various attributes such as a direction, a speed, a moving distance, a starting point, and an ending point of the user's gesture.

Thereafter, the electronic device 100 determines a gesture type of the user's gesture (S153). A type of the user's gesture includes a first gesture type (i.e., a gesture type for the first object moving action) for changing a position of an icon object OB within one virtual layer L and a second gesture type (i.e., a gesture type for the second object moving action) for changing a position of an icon object OB from one virtual layer L1 to another virtual layer L2.

The electronic device 100 determines a gesture type by analyzing an attribute of a user's gesture, and particularly, the electronic device 100 determines a gesture type based on a moving direction of the user's gesture.

Figure 25:
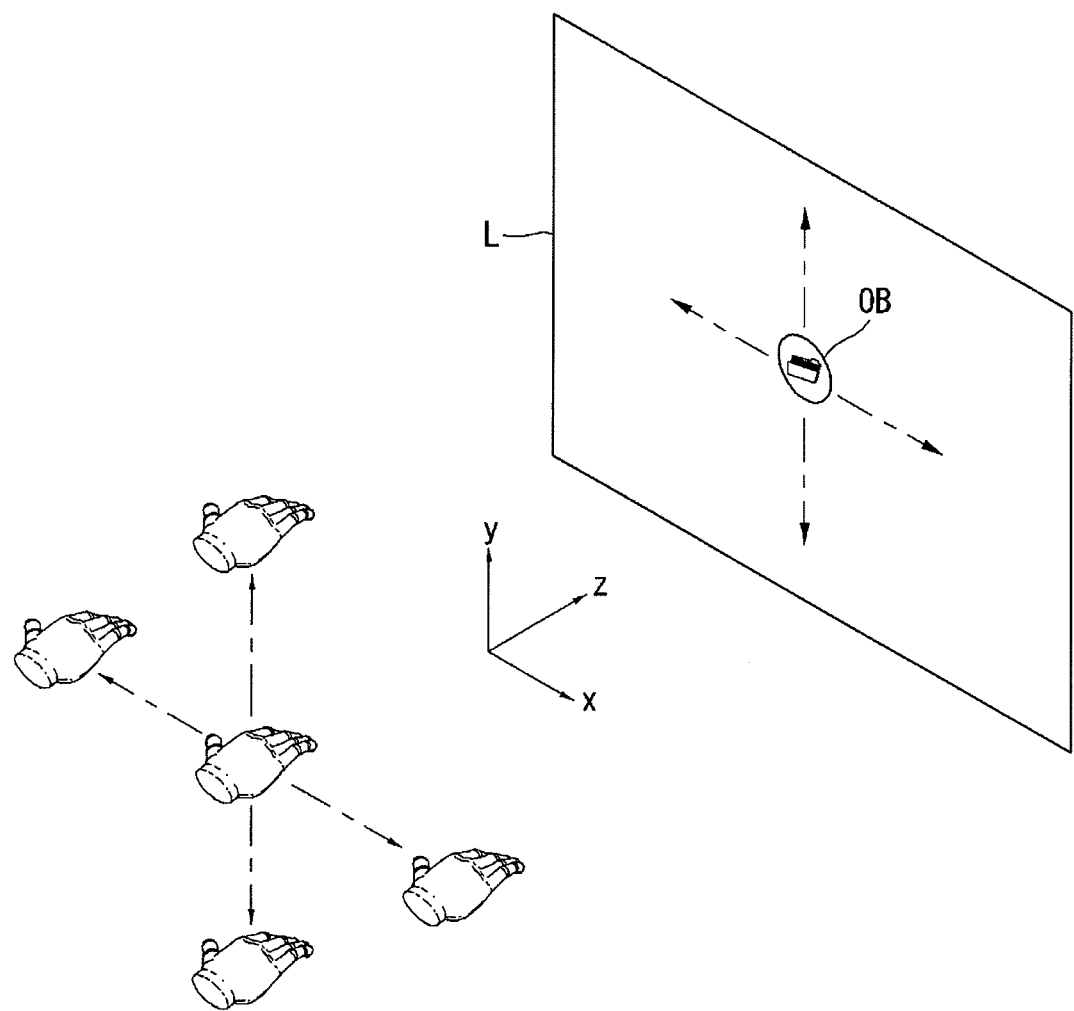

For example, referring to FIG. 25, the user can take a gesture having displacement of an x-axis and/or y-axis direction through step S151 (or step S120). In this case, the electronic device 100 determines that the user's gesture is a first gesture type. That is, when the user's gesture action has only displacement of a direction substantially parallel to the virtual layer, the electronic device 100 determines that the user's gesture is the first gesture type.

Figure 26:
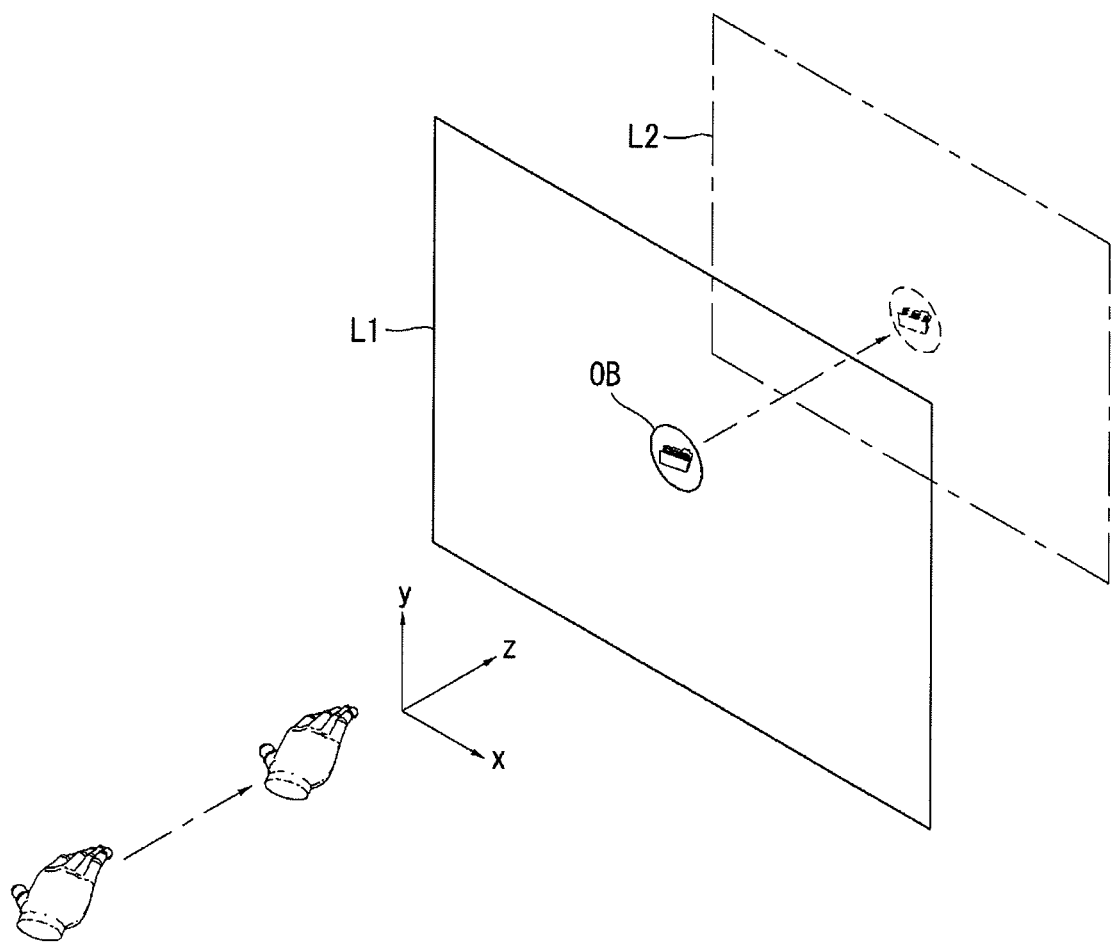

Referring to FIG. 26, the user can take a gesture having displacement of a z-axis direction through step S151 (or step S120). In this case, the electronic device 100 determines that the user's gesture is a second gesture type. That is, when the user's gesture action includes displacement of a direction substantially perpendicular to a virtual layer, the electronic device 100 determines that the user's gesture is the second gesture type. Alternatively, when the user's gesture action advances from a virtual layer to another virtual layer, the electronic device 100 determines that the user's gesture is the second gesture type.

In this case, in an actual use, a case where a gesture motion of the user includes only displacement of x-axis and y-axis and does not include displacement of z-axis is rare. Therefore, when displacement of all directions of x-axis, y-axis, and z-axis is analyzed from the user's gesture, the electronic device 100 sets a critical value of each direction and ignores a displacement value in a direction of a displacement value that does not exceed a critical value. That is, as shown in FIG. 25, when the user moves the user's hand gesture from the left side to the right side in x-axis, even if displacement of a z-axis direction is detected from the user's hand gesture, when the displacement of a z-axis direction does not exceed a critical value that is set to z-axis, it is analyzed that displacement of the z-axis direction does not exist. That is, in such a case, it is defined that the user's gesture has only displacement of x-axis and/or y-axis. This may be equally applied to a case of x-axis and y-axis. Critical values of each-axis may be differently set.

The critical value may be varied according to a size of a displacement value of the gesture. For example, when the user moves a hand by 20 in an x-axis direction, if a critical value that is set to z-axis is set to 2, when the user moves a hand by 40 to an x-axis direction, a critical value that is set to z-axis is set to 4. When a displacement value by the user's hand gesture is large, a possibility in which displacement of a direction that is not intended by the user is included in the user's hand gesture increases, and in this case, when a critical value is set to vary, the electronic device 100 can more accurately analyze the user's intention.

Similarly, when a user's gesture action includes all displacement of x-axis, y-axis, and z-axis, but when a displacement value of x-axis and/or y-axis does not exceed a critical value of each axis and only a displacement value of z-axis exceeds a critical value of z-axis, the electronic device 100 determines that a user's gesture substantially has only displacement of a z-axis direction.

The electronic device 100 changes a position of an icon object OB according to determination at step S153 (S154). That is, when a user's gesture is the first type, the electronic device 100 changes a position of an icon object OB within one virtual layer L, as shown in FIG. 25, and when a user's gesture is the second type, the electronic device 100 changes a position of an icon object OB from one virtual layer L1 to another virtual layer L2, as shown in FIG. 26.

When changing a position of an icon object through step S154, the electronic device 100 determines to move an icon object to which position within one virtual layer L (i.e., when performing the first object moving action), or determines to move an icon object from one virtual layer L1 to a position of another virtual layer (i.e., when performing the second object moving action, particularly, when the number of virtual layers is three or more) according to a motion attribute of a user's gesture analyzed at step S152. For example, when moving an icon object included in a top level virtual layer to another virtual layer, the electronic device 100 determines to move the icon object to a virtual layer positioned at a next level of a top level virtual layer, or to move the icon object to a virtual layer positioned at a level lower than a top level.

First, a case where the electronic device 100 performs the first object moving action is described.

For example, as shown in FIG. 27, the electronic device 100 analyzes a motion distance of a user's gesture and determines a change distance of an icon object OB within one virtual layer L according to the motion distance. For example, when the user's gesture moves from P1 to P2, the icon object OB may be moved to a first position OP1, and when the user's gesture moves from P1 to P3, the icon object OB may be moved to a second position OP2, and when the user's gesture moves from P1 to P4, the icon object OB may be moved to a third position OP3. That is, a change distance of the icon object OB may depend on a moving distance of the user's gesture. The change distance of the icon object OB may be changed along a curved line CV1 according to a moving distance of the user's gesture. A relationship between a change distance of the icon object OB and a motion distance of the user's gesture can be variously set, as shown in FIG. 27(b).

In another example, as shown in FIG. 28, the electronic device 100 analyzes a speed of a user's gesture and determines a change distance of an icon object OB within one virtual layer L according to the speed. For example, when the user's gesture moves from P1 to P2, the user's gesture may move with various speeds, and when the user's gesture moves with a speed V1, the icon object OB may move to a first position OP1, and when the user's gesture moves with a speed V2 (V2>V1), the icon object OB may move to a second position OP2, and when the user's gesture moves with a speed V3 (V3>V2), the icon object OB may move to a third position OP3.

Next, a case where the electronic device 100 performs the second object moving action is described.

Figure 29:
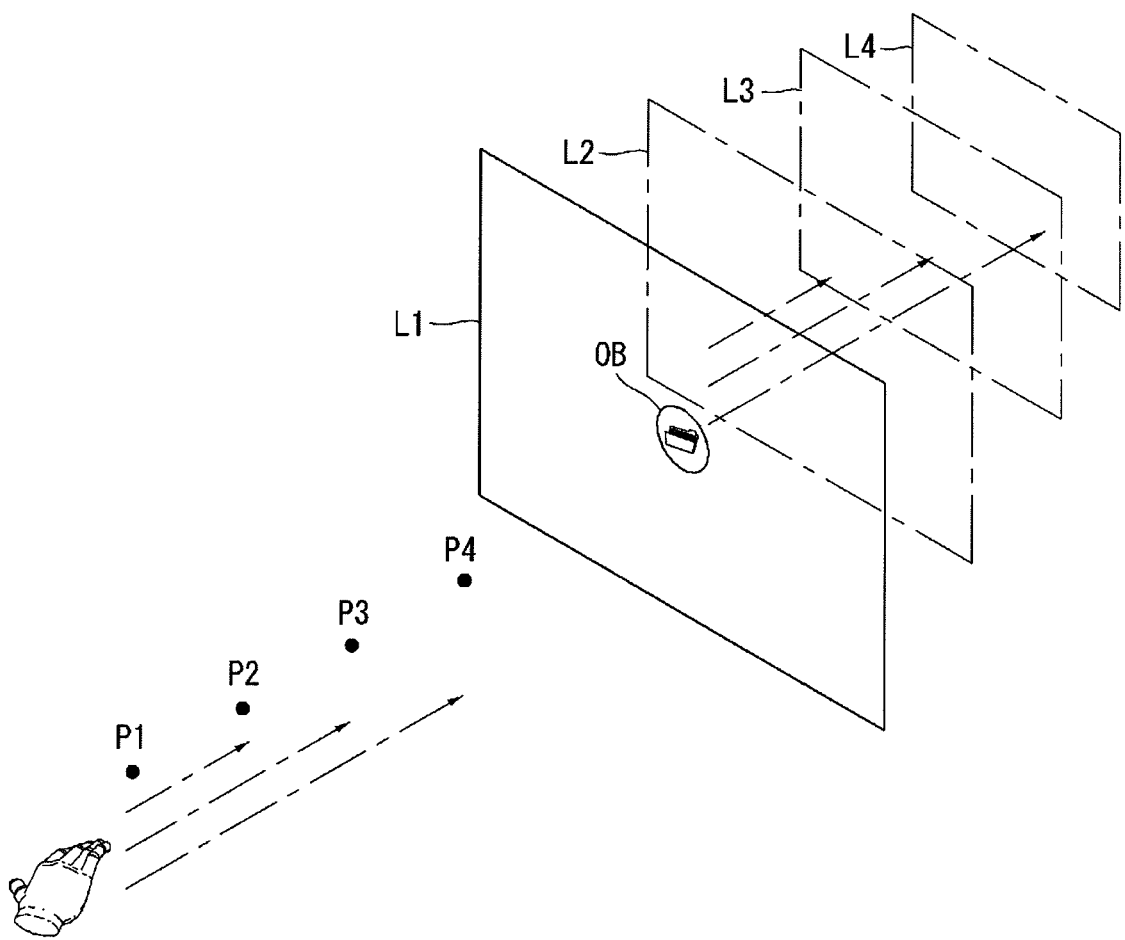

For example, as shown in FIG. 29, the electronic device 100 analyzes a motion distance of a user's gesture and determines to move an icon object OB from one virtual layer L1 to any virtual layer according to the motion distance. For example, when the user's gesture moves from P1 to P2, the icon object OB may be moved from the first virtual layer L1 to the second virtual layer L2, and when the user's gesture moves from P1 to P3, the icon object OB may be moved from the first virtual layer L1 to the third virtual L3, and when the user's gesture moves from P1 to P4, the icon object OB may be moved from the first virtual layer L1 to the fourth virtual L4. That is, a change distance of the icon object OB may depend on a motion distance of the user's gesture.

Figure 30:
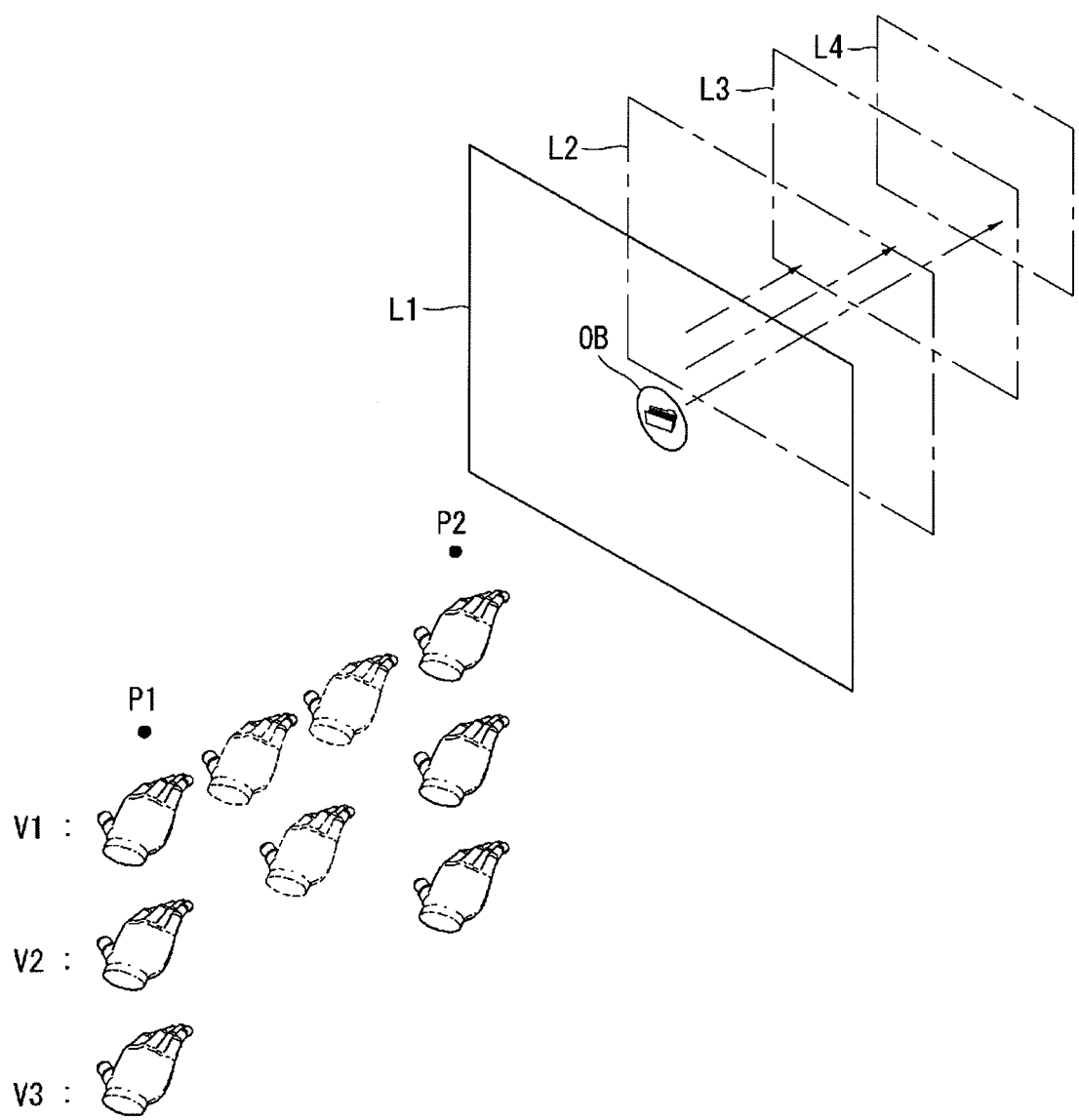

In another example, as shown in FIG. 30, the electronic device 100 analyzes a speed of the user's gesture and determines to move an icon object OB from one virtual layer to any virtual layer according to the speed. For example, when the user's gesture moves from P1 to P2, the user's gesture may move with various speeds, and when the user's gesture moves with a speed V1, the icon object OB may be moved from the first virtual layer L1 to the second virtual layer L2, and when the user's gesture moves with a speed V2 (V2>V1), the icon object OB may be moved from the first virtual layer L1 to the third virtual layer L3, and when the user's gesture moves with a speed V3 (V3>V2), the icon object OB may be moved from the first virtual layer L1 to a fourth virtual layer L4.

When analyzing a gesture acquired through step S151 at step S152, a specific user input that instructs the start and the end of the user's gesture may exist. The specific user input may include voice and/or a gesture. For example, when the user U makes a gesture of puckering fingers, such as holding a specific icon object, the electronic device 100 may recognize this as the start of the user's gesture and thus a starting point of the user's gesture may be determined. Thereafter, in a state in which the user puckers fingers, as shown in FIGS. 25 to 30, after performing a gesture, when the user spreads again puckered fingers, such as putting a specific icon object, the electronic device 100 may recognize this as termination of the user's gesture and thus an ending point of the user's gesture may be determined.

The electronic device 100 can set various critical values of each attribute when analyzing the user's gesture.

For example, when a critical value of a moving distance of the user's gesture is set to 5, the electronic device 100 analyzes a moving distance of the user's gesture, and when the moving distance of the user's gesture has a value less than 5, a position of the icon object may not move. When the moving distance of the user's gesture has a value of 5 or more and less than 10, the electronic device 100 can move a position of each icon object to a next position, as described above. Further, when the moving distance of the user's gesture has a value of 10 or more and less than 15, the electronic device 100 can move a position of the icon object by two levels. Even when the moving distance of the user's gesture has a value of 15 or more, the above-described description can be applied thereto.

In another example, when a critical value of a speed of the user's gesture is set to 5, the electronic device 100 analyzes a speed of the user's gesture, and when the speed of the user's gesture has a value less than 5, a position of the icon object may not move. When the speed of the user's gesture has a value of 5 or more and less than 10, the electronic device 100 can move a position of each icon object to a next position, as described above. Even when the speed of the user's gesture has a value of 10 or more, the above-described description can be applied thereto.

When changing a position of the icon object according to the user's gesture, the electronic device 100 can consider not only one attribute of the user's gesture but also a plurality of attributes. For example, the electronic device 100 may consider both a moving distance and a speed attribute of the user's gesture, and in this case, when the moving distance of the user's gesture does not exceed the above-described critical value, but when a speed of the user's gesture exceeds the above-described critical value, the electronic device 100 can change a position of the icon object.

The electronic device 100 can provide an animation effect such as movement of the icon object to correspond to a real time action of the user's gesture to the icon object according to the user's gesture. In this case, when an attribute of the user's gesture does not exceed a critical value that is set thereto, an animation effect in which the icon object moves to a next position and returns again to an original position according to movement of the user's gesture can be applied.

Alternatively, as described above, when a specific user input that instructs the start and the end of the user's gesture exists, if a specific gesture indicating the termination of the user's gesture is recognized, the electronic device 100 provides and displays an animation effect to movement of the icon object to a position corresponding thereto. For example, when an icon object existing at the first position should be moved to a third position, after the specific gesture is recognized, the electronic device 100 can provide an animation effect to movement of the icon object so that the user may recognize that an icon object continuously moves from the first position to the third position instead of discontinuously moving and displaying a position of an icon object from the first position to the third position. The animation effect can be variously provided. For example, an icon object appropriately moves to a position corresponding to the user's gesture, but an animation effect guided to a magnet positioned at the corresponding position may be provided.

In the foregoing description, according to an exemplary embodiment of the present invention, when the electronic device 100 changes a position of an icon object, a method in which the electronic device 100 analyzes the user's gesture and determines to change a position of an icon object within one virtual layer, or to change a position of an icon object from a virtual layer to another virtual layer will be described. Hereinafter, another exemplary embodiment of the present invention will be described.

FIG. 31 describes a method according to another embodiment of the invention. The method of FIG. 31 may be performed by the devices of FIGS. 1-2.

As shown in FIG. 31, the electronic device 100 performs at least one of step of acquiring a user's gesture (S155), step of determining a gesture input mode (S156), step of changing a position of an icon object within one virtual layer (S157), and step of changing a position of an icon object from one virtual layer to another virtual layer (S158), thereby determining to perform the first object moving action or the second object moving action.

Step S155 corresponds to step S120, and a user's gesture acquired at step S155 may be a gesture different from a user's gesture acquired at step S120.

The electronic device 100 determines a gesture input mode that is set to the electronic device 100 (S156). For example, the electronic device 100 may determine whether a gesture input mode that is presently set to the electronic device 100 is a third mode or a fourth mode.

A gesture input mode of the electronic device 100 determined at step S156 is an input mode different from the gesture input mode determined at step S130. That is, the gesture input mode determined at step S130 is an input mode related to a change of a position of a virtual layer according to a gesture, or a change of a position of an icon object, but a gesture input mode determined at step S156 is an input mode related to movement of a position of an icon object within one virtual layer according to a gesture, or movement of a position of an icon object from one virtual layer to another virtual layer.

Here, the third mode is a mode that can change a position of an icon object according to a user's gesture within one virtual layer. The fourth mode is a mode that can change a position of an icon object from one virtual layer to another virtual layer according to a user's gesture.

A gesture input mode of the electronic device 100 can be set by various methods, and hereinafter, this will be described in detail.

First, the gesture input mode may be set by a user's specific gesture. For example, when at least one virtual layer including at least one icon object OB is output to three-dimensional space, if a user does not take a preset specific gesture, a gesture input mode of the electronic device 100 is set to the fourth mode. In this case, if the user U makes a preset specific gesture, the gesture input mode of the electronic device 100 is changed to the third mode.

For example, when the user U makes no gesture, the electronic device 100 basically sets the fourth mode as an input mode, and as shown in FIG. 32, when the user U makes a specific gesture, such as holding a virtual layer L using a thumb and an index finger of a left hand LH, the electronic device 100 changes and sets a gesture input mode from the fourth mode to the third mode.

Alternatively, when the user U makes no specific gesture, the gesture input mode of the electronic device 100 is set to the third mode, and when the user U makes a preset specific gesture, the gesture input mode of the electronic device 100 is changed to the fourth mode.

Further, FIG. 32 illustrates a case where a gesture input mode is changed according to a hand gesture using a left hand LH, but a change of a gesture input mode is not limited thereto and a gesture input mode can be changed according to a hand gesture using a right hand LH. A gesture shown in FIG. 32 is an example of a preset gesture for changing a gesture input mode described in the present invention, and a scope of the present invention is not limited thereto. For example, various gestures such as a gesture in which the user U clenches a fist and a gesture that spreads all fingers of the user U in a state of the first mode may be preset as a gesture to be used for changing an input mode.

The third mode is sustained only when the user U makes a preset specific gesture in order to change the fourth mode to the third mode. For example, only when the user continues to take a gesture shown in FIG. 32, the gesture input mode is set to the third mode, and when the user no longer takes a gesture shown in FIG. 32, the gesture input mode is returned and set to the fourth mode.

Second, the gesture input mode may be set through an input interface other than a gesture. For example, the gesture input mode may be set by user input through a remote control and an input through voice of the user U. For example, the electronic device 100 may be set to the third mode by the user's specific voice input (for example, a voice command such as 'hold'), and the electronic device 100 may be set to the fourth mode by another user's specific voice input (for example, a voice command such as 'release').

Referring again to FIG. 31, after performing step S156, the electronic device 100 selectively performs step S157 or step S158.

A method of moving a position of an icon object within one virtual layer according to step S157 (i.e., a first object moving action) and a method of moving a position of an icon object from one virtual layer to another virtual layer according to step S158 (i.e., a second object moving action) may be similar or equal to a method described at step S154. Therefore, a detailed description thereof will be omitted.

When performing the second object moving action, a position of an icon object selected in a state in which a position of a virtual layer is fixed is changed according to the user's gesture, but according to several exemplary embodiments of the present invention, when a position of a selected icon object is fixed, by changing a position of the virtual layer, a method of changing a position of an icon object may exist. For example, as shown in FIG. 33, when the user U makes a gesture with a left hand LH in a state of taking a gesture of holding an icon object OB with fingers of a right hand RH, the electronic device 100 controls the display unit 151 to fix a position of an icon object OB by a gesture of a right hand RH and changes a position of virtual layers L1, L2, and L3 according to a gesture by the left hand LH. A detailed description of a position change of the virtual layers L1, L2, and L3 has been described and therefore a detailed description thereof will be omitted. A position change of a virtual layer by such a user's gesture is shown in FIG. 34. Referring to FIG. 34, it can be seen that a position L1, which was a top level virtual layer in FIG. 33 is changed to a lowest level layer in FIG. 34 by a user's gesture, and it can be seen that a position L2, which was an intermediate level virtual layer in FIG. 33 is changed to a top level virtual layer in FIG. 34 by a user's gesture.

Each exemplary embodiment of the above-described method of displaying a three-dimensional image according to the present invention can be used individually or in combination. Further, steps constituting each exemplary embodiment can be used individually or in combination with steps constituting another exemplary embodiment.

Further, each exemplary embodiment of the above-described method of displaying a three-dimensional image according to the present invention may be recorded and provided in a computer readable medium with a program for executing in a computer. Each exemplary embodiment according to the present invention may be performed through software. When each exemplary embodiment is performed with software, constituent elements of the present invention are code segments for executing a necessary operation. A program or code segments may be stored in a processor readable medium or may be transmitted by a transmission medium or a computer data signal coupled to carrier waves in a communication network.

A computer readable recording medium includes all kinds of recording mediums in which data that can be read by a computer system are stored. The computer readable recording medium includes, for example, read-only memory (ROM), random-access memory (RAM), CD-ROM, DVD±ROM, DVD-RAM, a magnetic tape, a floppy disk, a hard disk, and an optical data storage device. Further, a computer readable recording medium is distributed to a computer device connected to a network so that a computer readable code is stored and executed in a distribution fashion.

The present invention has at least the following advantages.

First, a user interface that can easily control an icon provided as a three-dimensional image and/or a menu layer including the icon, can be provided.

Second, a user interface that can easily edit a position of an icon provided as a three-dimensional image and/or a menu layer including the icon, can be provided.

Third, by providing a user interface that can control an icon provided as a three-dimensional image and/or a menu layer including the icon with a user's gesture, a user manipulation, can be performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a camera configured to capture a gesture of a user located in a field of view of the camera;
a three-dimensional (3D) display unit configured to generate a plurality of virtual planes comprising one of a first virtual plane and a second virtual plane different from the first virtual plane, and display a plurality of objects on the plurality of virtual planes as a 3D image;
a controller configured to change one of a display characteristic of the objects and a virtual plane characteristic based on the captured gesture and a gesture mode of the electronic device,
wherein the display characteristic is one of a vertical location and a horizontal location of the objects within the one of the first and second virtual planes,
wherein the virtual plane characteristic is a depth of the one of the first and second virtual planes, and
wherein the gesture mode comprises:
a first mode changing a position of the plurality of virtual planes in a 3D space, and
a second mode changing a position of at least one of the plurality of objects from the first virtual plane to the second virtual plane in the 3D space,
wherein the controller is further configured to execute a function based on the gesture mode when an attribute of the captured gesture is greater than a critical value, the attribute comprising at least one of a moving speed and a moving distance of the captured gesture.

2. The electronic device of claim 1, wherein the captured gesture is a gesture substantially toward or away from the camera.

3. The electronic device of claim 1, wherein the captured gesture comprises simultaneous first and second gestures separated by a specific distance.

4. The electronic device of claim 1,
wherein the display characteristic is an assignment of the objects to the one of the first and second virtual planes, and
wherein the controller is configured to change the assignment of the objects from the first virtual plane to the second virtual plane, or from the second virtual plane to the first virtual plane.

5. The electronic device of claim 4, wherein the first and second virtual planes are located on a common plane separated by a predetermined distance.

6. The electronic device of claim 1, wherein the controller is configured to:
horizontally rotate the one of the first and second virtual planes around a virtual point in front of the 3D display unit, or
vertically rotate the one of the first and second virtual planes around the virtual point in front of the 3D display unit.

7. The electronic device of claim 1, wherein the controller is configured to set the gesture mode based on a specific user gesture captured by the camera.

8. The electronic device of claim 1, wherein the controller is configured to set the gesture mode based on one of a user voice command and a user input to a control device connected to the electronic device via one of a wired connection and a wireless connection.

9. The electronic device of claim 1, wherein the controller is configured to change the one of the display characteristic of the objects and a virtual plane characteristic based on one of a speed and a distance of the captured gesture.

10. The electronic device of claim 1, wherein the first virtual plane and the second virtual plane are substantially parallel to each other and to a display surface of the 3D display unit.

11. A method of controlling a three-dimensional (3D) display device having a camera, the method comprising:
- capturing a gesture of a user located in a field of view of the camera;
- generating a plurality of virtual planes comprising one of a first virtual plane and a second virtual plane different from the first virtual plane;
- displaying a plurality of objects on the plurality of virtual planes as a 3D image; and
- changing one of a display characteristic of the objects and a virtual plane characteristic based on the captured gesture and a gesture mode of the electronic device,
- wherein the display characteristic is one of a vertical location and a horizontal location of the objects within the one of the first and second virtual planes,
- wherein the virtual plane characteristic is a depth of the one of the first and second virtual planes, and
- wherein the gesture mode comprises:
  - a first mode changing a position of the plurality of virtual planes in a 3D space, and
  - a second mode changing a position of at least one of the plurality of objects from the first virtual plane to the second virtual plane in the 3D space,
  - wherein the controller is configured to execute a function based on the gesture mode when an attribute of the captured gesture is greater than a critical value, the attribute comprising at least one of a moving speed and a moving distance of the captured gesture.

12. The method of claim 11, wherein the captured gesture is one of:
- a gesture substantially toward or away from the camera,
- a gesture substantially across the field of view of the camera, and
- simultaneous first and second gestures separated by a specific distance.

13. The method of claim 11,
- wherein the display characteristic is an assignment of the objects to the one of the first and second virtual planes, and
- wherein the step of changing the display characteristic includes changing the assignment of the objects from the first virtual plane to the second virtual plane, or from the second virtual plane to the first virtual plane.

14. The method of claim 13, wherein the first and second virtual planes are located on a common plane separated by a predetermined distance.

15. The method of claim 11, wherein the step of changing the virtual plane characteristic comprises one of:
- vertically rotating the one of the first and second virtual planes around a virtual point in front of the 3D display unit; and
- horizontally rotating the one of the first and second virtual planes around the virtual point in front of the 3D display unit.

16. The method of claim 11, further comprising:
setting the gesture mode based on one of:
a specific user gesture captured by the camera,
a user voice command, and
a user input to a control device connected to the 3D display device via one of a wired connection and a wireless connection.

17. The method of claim 11, wherein the step of changing comprises:
- changing the one of the display characteristic of the objects and the virtual plane characteristic based on one of a speed and a distance of the captured gesture.

18. The method of claim 11, wherein the first virtual plane and the second virtual plane are substantially parallel to each other and to a display surface of the 3D display device.

* * * * *